(12) United States Patent
Resnick et al.

(10) Patent No.: US 10,936,856 B2
(45) Date of Patent: Mar. 2, 2021

(54) METHODS AND APPARATUS FOR REDUCING FALSE POSITIVES IN FACIAL RECOGNITION

(71) Applicant: 15 Seconds of Fame, Inc., New York, NY (US)

(72) Inventors: Adam Resnick, Boca Raton, FL (US); Ruslan Sabitov, Jersey City, NJ (US)

(73) Assignee: 15 Seconds of Fame, Inc., Santa Monica, CA (US)

( * ) Notice: Subject to any disclaimer, the term of this patent is extended or adjusted under 35 U.S.C. 154(b) by 68 days.

(21) Appl. No.: 16/118,780

(22) Filed: Aug. 31, 2018

(65) Prior Publication Data

US 2020/0074151 A1 Mar. 5, 2020

(51) Int. Cl.
| | | |
|---|---|---|
| G06K 9/00 | (2006.01) | |
| G06N 3/08 | (2006.01) | |
| G06N 5/04 | (2006.01) | |
| H04W 4/02 | (2018.01) | |

(52) U.S. Cl.
CPC .......... *G06K 9/00288* (2013.01); *G06N 3/08* (2013.01); *G06N 5/046* (2013.01); *H04W 4/02* (2013.01); *G06K 2009/00328* (2013.01)

(58) Field of Classification Search
None
See application file for complete search history.

(56) References Cited

U.S. PATENT DOCUMENTS

| | | | |
|---|---|---|---|
| 5,144,685 A | 9/1992 | Nasar et al. | |
| 6,142,876 A | 11/2000 | Cumbers | |
| 6,532,345 B1 | 3/2003 | Gluck | |
| 6,591,068 B1 | 7/2003 | Dietz | |
| 6,745,186 B1 | 6/2004 | Testa et al. | |
| 6,819,783 B2 | 11/2004 | Goldberg et al. | |
| 7,023,367 B1 | 4/2006 | Manganaro | |

(Continued)

FOREIGN PATENT DOCUMENTS

| | | |
|---|---|---|
| JP | 2003-317100 | 11/2003 |
| JP | 2010-009389 | 1/2010 |

(Continued)

OTHER PUBLICATIONS

International Patent Application Publication No. WO2017070519A1 (Year: 2017).*

(Continued)

*Primary Examiner* — Soo Shin
(74) *Attorney, Agent, or Firm* — Cooley LLP

(57) ABSTRACT

An apparatus can include a memory, a communication interface, and a processor. The processor is configured to receive image data from an imaging device and first contextual data associated with the image data. The image data includes at least one image of a field of view. The processor is also configured to receive second contextual data associated with a user of a user device. The second contextual data is generated in response to the user device receiving a wireless signal sent by an antenna operably coupled to the imaging device. The processor is further configured to determine a potential presence of the user in the image data based on comparing the first contextual data with the second contextual data, analyze the image data to identify the user in the image data, and send the image data to the user.

25 Claims, 7 Drawing Sheets

(56) References Cited

U.S. PATENT DOCUMENTS

| | | | |
|---|---|---|---|
| 7,035,440 B2 | 4/2006 | Kaku | |
| 7,260,587 B2 | 8/2007 | Testa et al. | |
| 7,330,875 B1 | 2/2008 | Parasnis et al. | |
| 7,376,276 B2 | 5/2008 | Shniberg et al. | |
| 7,391,886 B1 | 5/2008 | Clark et al. | |
| 7,472,134 B2 | 12/2008 | Kaku | |
| 7,494,061 B2 | 2/2009 | Reinhold | |
| 7,526,106 B1 | 4/2009 | Clark et al. | |
| 7,532,811 B2 | 5/2009 | Sauder | |
| 7,552,228 B2 | 6/2009 | Parasnis et al. | |
| 7,561,723 B2 | 7/2009 | Goldberg et al. | |
| 7,619,660 B2 | 11/2009 | Grosvenor | |
| 7,684,651 B2 | 3/2010 | Tang et al. | |
| 7,783,085 B2 | 8/2010 | Perlmutter et al. | |
| 7,800,646 B2 | 9/2010 | Martin | |
| 7,860,347 B2 | 12/2010 | Tang et al. | |
| 7,881,968 B2 | 2/2011 | David | |
| 7,907,755 B1 | 3/2011 | Perlmutter et al. | |
| 7,953,690 B2 | 5/2011 | Luo et al. | |
| 7,965,908 B2 | 6/2011 | Hayashi | |
| 7,966,223 B2 | 6/2011 | David | |
| 7,995,806 B2 | 8/2011 | Goh et al. | |
| 8,014,572 B2 | 9/2011 | Xiao et al. | |
| 8,055,029 B2 | 11/2011 | Petrescu et al. | |
| 8,144,944 B2 | 3/2012 | Ishii | |
| 8,189,880 B2 | 5/2012 | Wen et al. | |
| 8,204,437 B1 | 6/2012 | Rothschild | |
| 8,233,679 B2 | 7/2012 | Perlmutter et al. | |
| 8,254,699 B1 | 8/2012 | Zhao et al. | |
| 8,260,674 B2 | 9/2012 | David | |
| 8,279,323 B2 | 10/2012 | Ishii | |
| 8,284,990 B2 | 10/2012 | Ma et al. | |
| 8,306,284 B2 | 11/2012 | Goldberg et al. | |
| 8,315,463 B2 | 11/2012 | Gallagher et al. | |
| 8,325,999 B2 | 12/2012 | Kapoor et al. | |
| 8,341,145 B2 | 12/2012 | Dodson et al. | |
| 8,392,957 B2 | 3/2013 | Holt et al. | |
| 8,406,481 B2 | 3/2013 | Goldberg | |
| 8,422,739 B2 | 4/2013 | Ianculescu et al. | |
| 8,560,625 B1 | 10/2013 | Hardman et al. | |
| 8,630,956 B2 | 1/2014 | Arisawa et al. | |
| 8,723,962 B2 | 5/2014 | Herring et al. | |
| 8,782,709 B2 | 7/2014 | Wang et al. | |
| 8,799,277 B2 | 8/2014 | Park et al. | |
| 8,825,872 B2 | 9/2014 | Reisman | |
| 8,831,275 B2 | 9/2014 | Goldberg | |
| 8,885,960 B2 | 11/2014 | Sauve et al. | |
| 8,898,464 B2 | 11/2014 | Bono et al. | |
| 8,928,760 B2 | 1/2015 | Schultz et al. | |
| 8,942,533 B2 | 1/2015 | Wiklof | |
| 8,949,619 B2 | 2/2015 | Parry et al. | |
| 8,957,981 B2 | 2/2015 | Fredlund et al. | |
| 9,007,420 B1 | 4/2015 | Passe | |
| 9,008,724 B2 | 4/2015 | Lord | |
| 9,104,907 B2 | 8/2015 | Whitehill et al. | |
| 9,131,147 B2 | 9/2015 | Quardordt et al. | |
| 9,189,682 B2 | 11/2015 | Salvador et al. | |
| 9,213,885 B1 * | 12/2015 | Schneiderman | G06K 9/00241 |
| 9,317,530 B2 | 4/2016 | Papakipos et al. | |
| 9,386,180 B2 | 7/2016 | Oki | |
| 9,396,354 B1 | 7/2016 | Murphy et al. | |
| 9,420,315 B2 | 8/2016 | Melanson | |
| 9,531,998 B1 | 12/2016 | Farrell et al. | |
| 9,652,663 B2 | 5/2017 | Lau et al. | |
| 9,668,002 B1 | 5/2017 | Baron et al. | |
| 9,712,800 B2 | 7/2017 | St. Clair | |
| 9,723,334 B2 | 8/2017 | Melanson | |
| 9,852,364 B2 | 12/2017 | Liu et al. | |
| 9,967,596 B2 | 5/2018 | Melanson | |
| 10,019,136 B1 | 7/2018 | Ozog | |
| 10,027,726 B1 | 7/2018 | Ozog | |
| 10,027,727 B1 | 7/2018 | Ozog | |
| 10,094,655 B2 | 10/2018 | Sabitov et al. | |
| 10,121,061 B2 | 11/2018 | Dickinson et al. | |
| 10,591,281 B2 | 3/2020 | Sabitov et al. | |
| 10,654,942 B2 | 5/2020 | Resnick et al. | |
| 2003/0023452 A1 | 1/2003 | Novais et al. | |
| 2003/0086123 A1 | 5/2003 | Torrens-Burton | |
| 2003/0118216 A1 | 6/2003 | Goldberg | |
| 2004/0008872 A1 | 1/2004 | Goldberg | |
| 2004/0156535 A1 | 8/2004 | Goldberg et al. | |
| 2005/0117022 A1 | 6/2005 | Marchant | |
| 2005/0254505 A1 | 11/2005 | Chang et al. | |
| 2005/0283497 A1 | 12/2005 | Nurminen et al. | |
| 2006/0020630 A1 | 1/2006 | Stager et al. | |
| 2006/0171603 A1 | 8/2006 | Jung et al. | |
| 2006/0229063 A1 | 10/2006 | Koch | |
| 2007/0003113 A1 | 1/2007 | Goldberg | |
| 2008/0091723 A1 | 4/2008 | Zuckerberg et al. | |
| 2008/0201327 A1 | 8/2008 | Seth | |
| 2008/0211904 A1 | 9/2008 | Kato et al. | |
| 2008/0243861 A1 | 10/2008 | Wassingbo et al. | |
| 2008/0260212 A1 * | 10/2008 | Moskal | A61B 5/1079 382/118 |
| 2008/0310688 A1 | 12/2008 | Goldberg | |
| 2009/0043725 A1 | 2/2009 | Gutta | |
| 2009/0074258 A1 | 3/2009 | Cotgreave | |
| 2009/0103887 A1 | 4/2009 | Choi et al. | |
| 2009/0185723 A1 | 7/2009 | Kurtz et al. | |
| 2009/0316961 A1 | 12/2009 | Gomez Suarez et al. | |
| 2010/0036875 A1 | 2/2010 | Miezianko | |
| 2010/0060727 A1 | 3/2010 | Steinberg et al. | |
| 2010/0150407 A1 | 6/2010 | Cheswick | |
| 2010/0158315 A1 | 6/2010 | Martin | |
| 2010/0172550 A1 | 7/2010 | Gilley et al. | |
| 2010/0207721 A1 | 8/2010 | Nakajima et al. | |
| 2010/0216441 A1 | 8/2010 | Larsson et al. | |
| 2010/0241658 A1 | 9/2010 | Rathurs et al. | |
| 2011/0013810 A1 | 1/2011 | Engstrom et al. | |
| 2011/0022529 A1 | 1/2011 | Barsoba et al. | |
| 2011/0064281 A1 | 3/2011 | Chan | |
| 2011/0066743 A1 | 3/2011 | Hurley et al. | |
| 2011/0142016 A1 | 6/2011 | Chatterjee | |
| 2011/0182482 A1 | 7/2011 | Winters et al. | |
| 2011/0182485 A1 | 7/2011 | Shochat et al. | |
| 2011/0188713 A1 | 8/2011 | Chin et al. | |
| 2011/0211736 A1 | 9/2011 | Krupka et al. | |
| 2011/0211737 A1 | 9/2011 | Krupka et al. | |
| 2011/0238755 A1 | 9/2011 | Khan et al. | |
| 2011/0282860 A1 | 11/2011 | Baarman et al. | |
| 2011/0307399 A1 | 12/2011 | Russell et al. | |
| 2012/0008837 A1 | 1/2012 | Goldberg et al. | |
| 2012/0027256 A1 | 2/2012 | Kiyohara et al. | |
| 2012/0056722 A1 | 3/2012 | Kawaguchi | |
| 2012/0250950 A1 | 10/2012 | Papakipos et al. | |
| 2012/0278395 A1 | 11/2012 | Garcia | |
| 2013/0040660 A1 | 2/2013 | Fisher et al. | |
| 2013/0089243 A1 | 4/2013 | Sauve et al. | |
| 2013/0117365 A1 | 5/2013 | Padmanabhan et al. | |
| 2013/0136316 A1 | 5/2013 | Grassel et al. | |
| 2013/0188844 A1 | 7/2013 | Goldberg | |
| 2013/0194438 A1 | 8/2013 | Sweet, III et al. | |
| 2013/0265448 A1 | 10/2013 | Li | |
| 2013/0265450 A1 | 10/2013 | Barnes, Jr. | |
| 2013/0269013 A1 | 10/2013 | Parry et al. | |
| 2013/0286223 A1 | 10/2013 | Latta et al. | |
| 2014/0028201 A1 | 1/2014 | Chang | |
| 2014/0064576 A1 | 3/2014 | Gong et al. | |
| 2014/0250126 A1 | 9/2014 | Baldwin et al. | |
| 2014/0267618 A1 | 9/2014 | Esteban et al. | |
| 2014/0289534 A1 | 9/2014 | Parry et al. | |
| 2014/0342330 A1 | 11/2014 | Freeman et al. | |
| 2014/0350840 A1 | 11/2014 | D'Argenio et al. | |
| 2014/0361974 A1 | 12/2014 | Li et al. | |
| 2015/0057995 A1 | 2/2015 | Neumann et al. | |
| 2015/0062334 A1 | 3/2015 | Dickinson et al. | |
| 2015/0066920 A1 | 3/2015 | Barta | |
| 2015/0081785 A1 | 3/2015 | Angelsmark et al. | |
| 2015/0081791 A1 | 3/2015 | Jacobs | |
| 2015/0124107 A1 | 5/2015 | Muriello et al. | |
| 2015/0169946 A1 | 6/2015 | Needleman | |
| 2015/0172787 A1 | 6/2015 | Geramifard | |
| 2015/0172853 A1 | 6/2015 | Liu et al. | |
| 2015/0181379 A1 | 6/2015 | Pai et al. | |

(56) References Cited

U.S. PATENT DOCUMENTS

| | | | |
|---|---|---|---|
| 2015/0227609 A1 | 8/2015 | Shoemaker et al. | |
| 2015/0227780 A1 | 8/2015 | Tussy | |
| 2015/0227782 A1 | 8/2015 | Salvador et al. | |
| 2015/0285856 A1 | 10/2015 | Garcia et al. | |
| 2015/0304368 A1 | 10/2015 | Vaccari et al. | |
| 2015/0347827 A1 | 12/2015 | Dickinson et al. | |
| 2016/0026853 A1* | 1/2016 | Wexler | G06F 16/532 |
| | | | 382/103 |
| 2016/0071101 A1 | 3/2016 | Winarski | |
| 2016/0073010 A1 | 3/2016 | Cronin et al. | |
| 2016/0105772 A1 | 4/2016 | Cohen | |
| 2016/0150124 A1 | 5/2016 | Panda et al. | |
| 2016/0182816 A1 | 6/2016 | Luk et al. | |
| 2016/0191434 A1 | 6/2016 | Rice | |
| 2016/0205358 A1 | 7/2016 | Dickinson | |
| 2017/0116466 A1* | 4/2017 | Resnick | A61K 39/39591 |
| 2017/0192401 A1* | 7/2017 | Wexler | G06F 3/002 |
| 2018/0025220 A1 | 1/2018 | Dickinson et al. | |
| 2018/0189571 A1 | 7/2018 | Seo et al. | |
| 2018/0234709 A1 | 8/2018 | Melanson | |
| 2018/0300554 A1 | 10/2018 | Kansara | |
| 2018/0341835 A1 | 11/2018 | Siminoff | |
| 2019/0034710 A1 | 1/2019 | Dickinson et al. | |
| 2019/0043351 A1* | 2/2019 | Yang | G06K 9/00771 |
| 2019/0045207 A1* | 2/2019 | Chen | G06F 21/45 |
| 2019/0087646 A1* | 3/2019 | Goulden | G08B 3/10 |
| 2019/0137261 A1 | 5/2019 | Sabitov et al. | |
| 2019/0179960 A1 | 6/2019 | Im et al. | |
| 2020/0217645 A1 | 7/2020 | Sabitov et al. | |

FOREIGN PATENT DOCUMENTS

| | | |
|---|---|---|
| JP | 2012-507761 | 3/2012 |
| WO | WO 2009/123711 | 10/2009 |
| WO | WO 2011/017653 | 2/2011 |
| WO | WO 2011/097041 | 8/2011 |
| WO | WO 2012/112992 | 8/2012 |
| WO | WO 2012/134756 | 10/2012 |
| WO | WO 2012/142054 | 10/2012 |
| WO | WO 2012/149397 | 11/2012 |
| WO | WO 2014/043738 | 3/2014 |
| WO | WO 2014/100519 | 6/2014 |
| WO | WO 2015/030911 | 3/2015 |
| WO | WO 2015/031863 | 3/2015 |
| WO | WO 2015/085246 | 6/2015 |
| WO | WO 2017/070519 | 4/2017 |

OTHER PUBLICATIONS

Office Action for U.S. Appl. No. 15/211,261, dated Nov. 30, 2017, 15 pages.
Office Action for U.S. Appl. No. 15/299,934, dated May 24, 2018, 15 pages.
Final Office Action for U.S. Appl. No. 15/299,934, dated Dec. 6, 2018, 19 pages.
Office Action for U.S. Appl. No. 15/299,934, dated Jul. 26, 2019, 17 pages.
International Search Report and Written Opinion for International Application No. PCT/US2016/042489, dated Oct. 21, 2016, 7 pages.
International Search Report and Written Opinion for International Application No. PCT/US2016/058189, dated Jan. 13, 2017, 8 pages.
International Search Report and Written Opinion for International Application No. PCT/US2019/048555, dated Nov. 29, 2019, 13 pages.
Extended Search Report for European Application No. 16825245.0, dated Mar. 20, 2019, 8 pages.
Extended European Search Report for European Application No. 16794804.1, dated Jul. 31, 2019, 14 pages.
Supplementary European Search Report for European Application No. 16794804.1, dated Apr. 30, 2019, 17 pages.

PR Newswire, FacialNetwork Releases New Demo of Facial Recognition App NameTag On Google Glass, Receives Cease and Desist from Facebook, Sep. 10, 2014, Retrieved from Internet: http://www.prnewswire.com/news-releases/facialnetwork-releases-new-demo-of-facial-recognition-app-nametag-on-google-glass-receives-cease-and-desist-from-facebook-274649581.html, 4 pages.
Penny Crosman, Biometric Tipping Point: USAA Deploys Face, Voice Recognition, Feb. 3, 2015. Retrieved from the Internet: http://www.americanbanker.com/news/bank-technology/biometric-tipping-point-usaa-deploys-face-voice-recognition-1072509-1.html?zkPrintable=1&nopagination=1, 7 pages.
Ironic Sans, Idea: Fun with facial recognition, Jan. 11, 2007. Retrieved from the Internet: http://www.ironicsans.com/2007/01/idea_fun_with_facial_recogniti.html, 5 pages.
Katy Daniells, FaceLook: Coca-Cola's Facial Recognition App, Aug. 2, 2011. Retrieved from the Internet: http://www.digitalbuzzblog.com/facelook-coca-colas-facial-recognition-app/, 12 pages.
Collen Kriel, Alibaba shows off facial recognition to secure mobile payments, Mar. 16, 2015. Retrieved from the Internet: http://siliconangle.com/blog/2015/03/16/alibaba-shows-off-facial-recognition-to-secure-mobile-payments/, 5 pages.
Co tree, Selfies—Automatic selfie by multiple faces detection, Released Mar. 26, 2015, Retrieved from the Internet: https://itunes.apple.com/us/app/selfies-automatic-selfie-by/id976846726?mt=8, 2 pages.
Julian Mitchell, STAPLES Center, AEG and Fanpics Partner to Put Fans At the Center of Major Sports Moments, May 27, 2015. Retrieved from the Internet: http://www.forbes.com/sites/julianmitchell/2015/05/27/staples-center-and-fanpics-team-up-putting-fans-at-the-center-of-major-sports-moments/2/#60ccf4ceba08, 5 pages.
Mori Rothman, Bringing facial recognition technology to the 'kiss cam' at sporting events, PBS Newshour, Sep. 24, 2013, Retrieved from the Internet: http://www.pbs.org/newshour/rundown/dhs-taps-into-crowd-cam-for-facial-recognition-research/, 2 pages.
Justin Lee, Securus patents facial recognition system for video visitation sessions, Biometric Update.com. Jun. 16, 2015. Retrieved from the Internet: http://www.biometricupdate.com/201506/securus-patents-facial-recognition-system-for-video-visitation-sessions, 3 pages.
Edgar Cervantes, Facebook will recognize you in photos where your face is not showing, Android Authority, Jun. 23, 2015. Retrieved from the Internet: http://www.androidauthority.com/facebook-recognize-photos-without-face-618957/, 5 pages.
ZoOmTM, The World's First Secure Selfie 3D Authentication App, Announced by FacialNetwork, Jul. 8, 2015. Retrieved from the Internet: http://www.marketwatch.com/story/zoomtm-the-worlds-first-secure-selfie-3d-authentication-app-announced-by-facialnetwork-2015-07-08, 9 pages.
Ryan Whitwam, Facebook developing way to fingerprint the camera you used to take a photo, Sep. 20, 2015. Retrieved from the Internet: http://www.geek.com/news/facebook-developing-way-to-fingerprint-the-camera-you-used-to-take-a-photo-1634542/, 3 pages.
Seatrade Cruise News, The Image Group provides photo buyers mobile-friendly instant gratification, Nov. 8, 2015. Retrieved from the Internet: http://www.seatrade-cruise.com/news/news-headlines/image-provides-photo-buyers-mobile-friendly-instant-gratification.html, 2 pages.
Planet biometrics, Facial recognition startup will scour web for user images, Feb. 3, 2016. Retrieved from the Internet: http://www.planetbiometrics.com/article-details/i/4100/desc/facial-recognition-startup-will-scour-web-for-user-images/, 2 pages.
Ashley Gurbal Kritzer, Tampa Bay Business Journal, Vinik—backed Seattle startup brings new tech to Amalie Arena for Lightning games, Feb. 5, 2016. Retrieved from the Internet: http://www.bizjournals.com/tampabay/blog/morning-edition/2016/02/vinik-backed-seattle-startup-brings-new-tech-to.html,A171, 4 pages.
PR Newswire, Sys.con Media, Waldo Photos Closes $5 Million Seed Funding Round Led by Upfront Ventures, Jan. 21, 2016. Retrieved from the Internet: http://news.sys-con.com/node/3643721, 6 pages.
Texas TechPulse, Waldo Photos: Finding Your Photos In the Proverbial Haystack, Feb. 3, 2016. Retrieved from the Internet: http://www.texastechpulse.com/waldo_photos_finding_your_photos_in_the_proverbial_haystack/s-0063812.html, 3 pages.

(56) References Cited

OTHER PUBLICATIONS

Rachel Metz, A New Way to Use Facial Recognition to Find Photos of You, Feb. 2, 2016, MIT Technology Review. Retrieved from the Internet: https://www.technologyreview.com/s/600690/a-new-way-to-use-facial-recognition-to-find-photos-of-you/, 3 pages.
Colin Morris, HomeAdvisor co-founders launch photo marketplace powered by facial recognition, Built in Austin, Jan. 22, 2016. Retrieved from the Internet: http://www.builtinaustin.com/2016/01/22/waldo-photos-5-million-seed-round, 3 pages.
PR Rocket, Photo-Sharing Image Recognition Tools Advocacy Campaign Launched by ScanMyPhotos.com, Mar. 8, 2016. Retrieved from the Internet: http://www.pressreleaserocket.net/photo-sharing-image-recognition-tools-advocacy-campaign-launched-by-scanmyphotos-com/419781/, 3 pages.
Taylor Soper, Ex-Microsoft manager raises cash from sports team owners to enhance the fan experience at live games, GeekWire, Feb. 4, 2016. Retrieved from the Internet: http://www.geekwire.com/2016/ex-microsoft-manager-raises-cash-sports-team-owners-enhance-fan-experience-live-games/, 16 pages.
Dave Gershgorn, A New App Automatically Sends That Group Photo to Your Friends, Popular Science, Mar. 7, 2016. Retrieved from the Internet: http://www.popsci.com/new-app-automatically-sends-that-group-photo-to-your-friends, 2 pages.
Rob Price, Snapchat has figured out a way to use facial recognition tech to protect people's privacy, Business Insider, Jul. 19, 2016. Retrieved from the Internet: http://www.businessinsider.com/new-snapchat-patent-uses-facial-recognition-tech-protect-privacy-photos-blurring-emojis-2016-7, 6 pages.
The Ghost in the Camera, How facial recognition technology mines your face for information, Feb. 2016, 1 page.
ComputerWorld, Face Recognition app FindFace may make you want to take down all your online photos, May 18, 2016, 3 pages.
Kim Brunhuber, Facial recognition tech is allowing stores to reward customers, CBC News, May 2, 2016, 5 pages.
Sarah Perez, Lambda Labs Is Launching A Facial Recognition API For Google Glass, May 23, 2013. Retrieved from the Internet: http://techcrunch.com/2013/05/23/lambda-labs-is-launching-a-facial-recognition-api-for-google-glass/, 15 pages.
Doug Bolton, FindFace app which uses facial recognition to identify strangers on social media takes Russia by storm, May 18, 2016. http://www.independent.co.uk/life-style/gadgets-and-tech/news/findface-vk-app-social-media-facial-recognition-android-ios-a7035556.html, 2 pages.
Michelle Ma, Moving cameras talk to each other to identify, track pedestrians, Nov. 12, 2014. Retrieved from the Internet: http://www.washington.edu/news/2014/11/12/moving-cameras-talk-to-each-other-to-identify-track-pedestrians/, 6 pages.
Ben Coxworth, "Software could determine where a video was shot, based on scenery and ambient sound," Feb. 19, 2015, Gizmag.com, retrieved from the internet at http://www.gizmag.com/video-geolocation- IQorithms/36172 on Oct. 6, 2015, 3 pages.
OSnap, Tutorial 2: Time-Lapse—Daily Self Portrait, Retrieved Nov. 30, 2016 from the Internet: http://www.osnapphotoapp.com/tutorial2.php, 6 pages.
Fanpics, Tell Your Story. Retrieved Nov. 30, 2016 from the Internet: https://www.fanpics.com/about, 3 pages.
Sarah Perez, Waldo Raises $5 Million For A Photo-Finding Platform Targeting Professional Photographers & Events, TechCrunch, Jan. 21, 2016. Retrieved from the Internet: Dec. 2, 2016 at https://techcrunch.com/2016/01/21/waldo-raises-5-million-for-a-photo-finding-platform-targeting-professional-photographers-events/, 9 pages.
Magtoapp, Inc., iTunes Preview, Celebtwin: Celebrity Look Alike Lite. Updated Jul. 5, 2016, Retrieved Dec. 2, 2016 from the Internet: https://itunes.apple.com/us/app/celebtwin-celebrity-look-alike/id381722077?mt=8, 2 pages.
Lamdba Labs, API Documentation. Retrieved from the Internet on Jan. 17, 2019 at https://lambdal.com/api-documentation, 2 pages.
Knoto, published 2016, Retrieved Dec. 12, 2016 from the Internet: http://knoto.com/, 5 pages.
Naaman, et al. Stanford University, "Leveraging Context to Resolve Identity in Photo Albums", 2005, 10 pages.
Amy Held, Google App Goes Viral Making an Art Out of Matching Faces to Paintings, Jan. 15, 2018, NPR.org, Retrieved from the Internet: https://www.npr.org/sections/thetwo-way/2018/01/15/578151195/google-app-goes-viral-making-an-art-out-of-matching-faces-to-paintings, 8 pages.
Chris Welch, How to Stop Facebook from Looking for You With Face Recognition, Mar. 27, 2018. Retrieved from the Internet: https://www.theverge.com/2018/3/27/17165150/facebook-face-recognition-how-to-turn-off-disable, 6 pages.
Vlad Savoy, Sony Promises Better Face Identification Through Depth-Sensing Lasers, Jan. 2, 2019. Retrieved from the Internet: https://www.theverge.com/2019/1/2/18164881/sony-tof-laser-depthsensing-3d-camera-report, 3 pages.
Jack Alexander, Next Generation of iPhones to 'Revolutionize' Photography, May Include Sony's 3D Technology and Advanced Facial Recognition, Dec. 29, 2018. Retrieved from the Internet: https://fstoppers.com/news/next-generation-iPhones-revolutionize-photography-may-include-sonys-3D-322630, 2 pages.
Peter Holley, This Patent Shows Amazon May Seek to Create a 'Database of Suspicious Persons' Using Facial-Recognition Technology, Dec. 18, 2018, Washingtonpost.com, Retrieved from the Internet: https://www.washingtonpost.com/technology/2018/12/13/this-patent-shows-amazon-may-seek-create-database-suspicious-persons-using-facial-recognition-technology/?utm_term=.476ede26a7f8, 3 pages.
Dave Brooks, Nathan Hubbard's Plan to 'Rival' Ticketmaster Makes Big Claims, But Offers Few Details, May 4, 2018, Retrieved from the Internet: https://www.billboard.com/articles/business/8454599/nathan-hubbard-ticketmaster-rival, 3 pages.
Zhang et al., "Image Based Localization in Urban Environments", 3D Data Processing, Visualization, and Transmission, Third International Symposium on, IEEE, PI, pp. 33-40 (2006).
Barr et al., "Face Recognition From Video: A Review", Draft 17 International Journal of Pattern Recognition and Artificial Intelligence, 2012, 56 pages, Retrieved from the Internet Nov. 19, 2013: URL:http://www3.nd.edu/-kwb/BarrEtAllJPRAI 2012.pdf.
James Vincent, "Facial Recognition Smart Glasses Could Make Public Surveillance Discreet and Ubiquitous," Updated Jun. 12, 2019. Retrieved from the Internet: URL: https://www.theverge.com/2019/6/10/18659660/facial-recognition-smart-glasses-sunglasses-surveillance-vuzix-nntc-uae, 4 pages.
Office Action issued by the Japanese Patent Office for Application No. 2018-521489, dated Dec. 9, 2019, 11 pages including English translation.
Office Action issued by the Japanese Patent Office for Application No. 2018-520402, dated Jun. 10, 2020, 7 pages including English translation.
Office Action issued by the Brazilian Patent Office for Application No. BR112018007979-0, dated Jul. 14, 2020, 5 pages including informal English translation.
FotoTiger Facial Recognition Webpage, dated Nov. 18, 2018, retrieved online on Mar. 25, 2020, at https://thenextweb.com/apps/2014/11/18/fototiger-facial-recognition-app-android-puts-photos/, 4 pages.
Waldo Photos, Retrieved from the Internet: https://waldo.photos/, published Oct. 9, 2016, Retrieved Nov. 30, 2016, 3 pages.

* cited by examiner

METHODS AND APPARATUS FOR REDUCING FALSE POSITIVES IN FACIAL RECOGNITION

BACKGROUND

The embodiments described herein relate generally to facial recognition and video analytics, and more particularly, to apparatus and methods for reducing false positives in facial recognition applications.

Increases in the availability and capability of electronic devices such as cameras, tablets, smartphones, etc. have allowed some people to take pictures and/or capture video of their experiences. For example, the inclusion and improvement of cameras in smartphones, tablets, and/or other similar devices have led to increases in those devices being used to take pictures (e.g., photographic data, image data, etc.) and videos (e.g., video stream data). While, it has become easier for some people to take pictures and/or videos of their experiences, in some instances, there can still be challenges in including the desired parties (including the person who would otherwise be taking the picture or video). Moreover, a person generally has to remember and/or have the chance to take the picture and/or video, and failing to do can result in a lost opportunity.

In some instances, venues and/or events such as sporting events, concerts, rallies, graduations, and/or the like have cameras that can take pictures and/or video of those in attendance. In some instances, however, analyzing, parsing, and/or otherwise making the pictures and/or video stream available can use a relatively large amount of resources, can be inaccurate, and/or can fail to provide associated contextual data or the like. More specifically, in some instances, it can be difficult to verify that a particular person detected in a picture, was actually in the location captured in the picture, due to false positives obtained from using facial recognition alone to identify people in pictures.

Thus, a need exists for improved apparatus and methods for using contextual and location data for reducing false positives at, for example, public events.

SUMMARY

In some implementations, an apparatus can include a memory, a communication interface in communication with the memory and configured to communicate via a network, and a processor in communication with the memory and the communication interface. The processor is configured to receive image data via the network and the communication interface from an imaging device and first contextual data associated with the image data. The image data includes at least one image of a field of view. The processor is also configured to receive, via the network and the communication interface, second contextual data associated with a user of a user device. The second contextual data is generated in response to the user device receiving a wireless signal (1) sent, in response to the imaging device generating the image data, by an antenna operably coupled to the imaging device and (2) covering at least a portion of the field of view. The processor is further configured to determine a potential presence of the user in the image data based on comparing the first contextual data with the second contextual data, analyze the image data based on at least one of two-dimensional facial recognition analytics, three-dimensional facial recognition analytics, or a convolutional neural network (CNN) to identify the user in the image data, and send the image data to the user.

In some implementations, an apparatus can include an imaging device configured to generate image data representative of a field of view, a communication interface in communication with the imaging device and configured to communicate via a network, and a processor in communication with the imaging device and the communication interface. In response to the imaging device generating the image data, the processor is configured to control the communication interface to broadcast a wireless signal covering at least a portion of the field of view. The wireless signal includes at least a portion of first contextual data associated with the image data. The processor is also configured to control the communication interface to send the image data and the first contextual data associated with the image data to a server via the network. In response to receiving the image data, the server determines a potential presence of a user in the image data based on comparing the first contextual data with second contextual data associated with the user of a user device and generated in response to the user device receiving the wireless signal, and analyzes the image data based on at least one of two-dimensional facial recognition analytics, three-dimensional facial recognition analytics, or a convolutional neural network (CNN) to identify the user in the image data.

In some implementations, an apparatus can include a communication interface and a processor in communication with the communication interface. The processor is configured to control the communication interface to receive, from a first device, a wireless signal including first contextual data associated with image data generated by an imaging device associated with the first device. The first device is further configured to send the image data and the first contextual data to a server. The processor is also configured to, in response to receiving the first contextual data, control the communication interface to send second contextual data to the server such that in response to receiving the second contextual data, the server determines a potential presence of a user in the image data based on comparing the first contextual data with the second contextual data, analyzes the image data based on at least one of two-dimensional facial recognition analytics, three-dimensional facial recognition analytics, or a convolutional neural network (CNN) to identify the user in the image data. The processor is configured to receive the image data from the server in response to the server identifying the user in the image data.

DETAILED DESCRIPTION

Figure 1A:
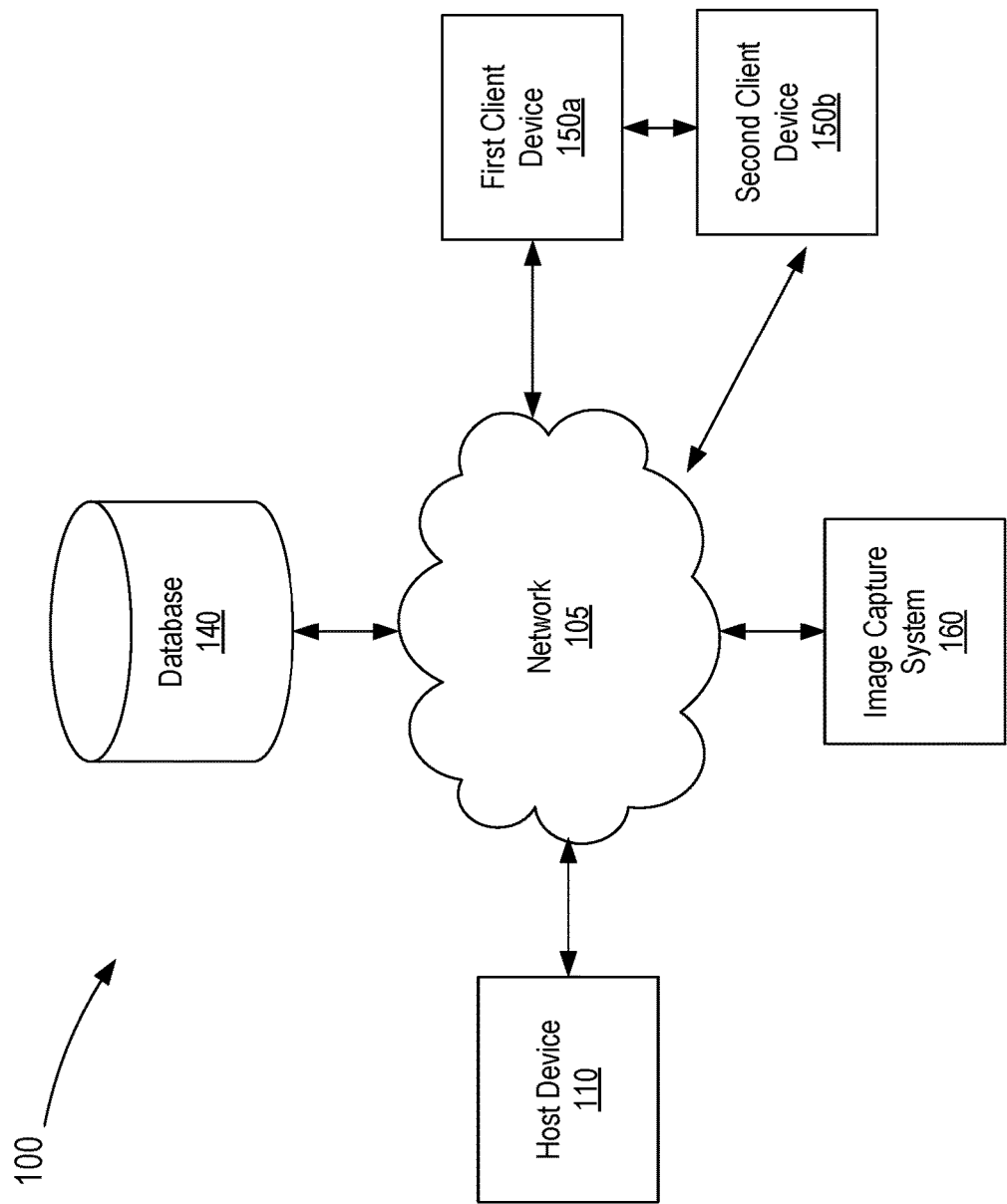
FIG. 1A is a schematic illustration of a recognition system according to an embodiment.

In some implementations, an apparatus can include a memory, a communication interface in communication with the memory and configured to communicate via a network, and a processor in communication with the memory and the communication interface. The processor is configured to receive image data via the network and the communication interface from an imaging device and first contextual data associated with the image data. The image data includes at least one image of a field of view. The processor is also configured to receive, via the network and the communication interface, second contextual data associated with a user of a user device. The second contextual data is generated in response to the user device receiving a wireless signal (1) sent, in response to the imaging device generating the image data, by an antenna operably coupled to the imaging device and (2) covering at least a portion of the field of view. The processor is further configured to determine a potential presence of the user in the image data based on comparing the first contextual data with the second contextual data, analyze the image data based on at least one of two-dimensional facial recognition analytics, three-dimensional facial recognition analytics, or a convolutional neural network (CNN) to identify the user in the image data, and send the image data to the user.

The embodiments described herein relate to detecting and/or confirming the presence of a user in media based on facial recognition data and contextual data associated with the media. In some embodiments, a method of image analysis includes receiving, at a host device (also referred to as a server) via a network, image data generated by a first user device (also referred to as a first client device) that includes an imaging device (e.g., configured for capturing an image of a field of view). The host device also receives first contextual data associated with the image data. In some implementations, the first contextual data is transmitted by the first user device as well. In some other implementations, the first contextual data is transmitted by another device operably coupled to the first user device (e.g., an antenna, a server, a communications interface, and/or any other suitable device).

The host device is also configured to receive, via the network, second contextual data associated with a user of a second user device (also referred to as a second client device). In some implementations, the second user device generates the second contextual data in response to receiving a wireless signal from the first user device, and the first user device generates the wireless signal in response to the imaging device generating the image data. The first user device is configured to broadcast the wireless signal such that the wireless signal covers at least a portion of the field of view. In other instances, the first user device does not send a wireless signal to the second user device and the second user device can send the second contextual data periodically, in response to a request from the host device, and/or based on any other event or timeframe.

The host device can then determine a potential presence of the user (i.e., associated with the second user device) in the image data based on comparing the first contextual data with the second contextual data. The host device also analyzes the image data based on at least one of two-dimensional facial recognition analytics, three-dimensional facial recognition analytics, or a convolutional neural network (CNN) to identify the user in the image data, and sends the image data to the user.

The comparison between the first contextual data and the second contextual data can be carried out in multiple implementations. In some implementations, the second user device generates the second contextual data spontaneously. In other words, the second user device generates the second contextual data without the involvement of the wireless signal from the first user device, and the first user device can be configured not to send out a wireless signal in response to generating the image data. For example, the second user device can send second location information (as part of the second contextual data) of the second user device to the host device, and the first contextual data includes first location information of the first user device. The first/second location information can include first/second geolocations of the first/second user. The host device can then compare the first location information with the second location information. If the two locations are within a predetermined value and/or range of each other (e.g., 1 meter, 2 meters, 5 meters, 10 meters, or any other suitable value), the host device can then determine that the user associated with the second user device is potentially present in the image data generated by the first user device. In these implementations, the second user device can send the second location information to the host device periodically, e.g., every 0.1 second, every 0.5 second, every 1 second, every 2 seconds, or at any other suitable frequencies.

The first contextual data can also include first timing information associated with the image data (e.g., timing point at which the image was taken), and the second contextual data can include second timing information representing the timing point at which the second contextual data was sent out. The host device can further compare this first timing information with the second timing information. If the two timing points are within a threshold value (e.g., 3 minutes, 2 minutes, 1 minute, 30 seconds, 15 seconds, or less, including any values and sub ranges in between), the host device can then determine that the second user is potentially present in the image data.

In some implementations, the second user device generates the second contextual data in response to receiving the wireless signal from the first user device. For example, in response to receiving the wireless signal from the first user device, the second user device sends the second contextual data including identification (ID) information associated with the user to the host device and a second timestamp. The second timestamp can be the time of receiving the wireless signal or the time of sending out the second contextual data. The first contextual data sent by the first user device includes a first timestamp representing the time of generating the image data. By comparing the two timestamps, the host device can determine whether the user is potentially present in the image data.

In another example, the first and second contextual data can include first and second location information representing the locations of the first user device and the second user device, respectively. By comparing the two location information, the host device can also determine the likelihood that the user is present in the image data.

In yet another example, the wireless signal sent by the first user device can include ID information associated with the image data and/or the first user device (e.g., a serial number). In response to receiving the wireless signal including the ID information, the second user device can forward at least part of the ID information to the host device. The first user device also sends the same ID information to the host device (e.g., contained in the first contextual data). The host device can then determine the likelihood of the user's presence in the image data based on whether the ID information in the second contextual data matches the ID information in the first contextual data.

In some implementations, both the first contextual data and the second contextual data can be sent to the host device by the second user device. For example, the wireless signal can include the first contextual data and the second user device then forwards this first contextual data (together with the second contextual data or as part of the second contextual data) to the host device. The first contextual data can include ID information associated with the first user device and/or the image data. The host device can then determine that the second user device is in proximity of the first user device based on the fact that ID information associated with the first user device and/or the image data is contained in data from the second user device.

The facial recognition performed by the host device can be either before or after the comparison of the first contextual data with the second contextual data. In some implementations, the host device compares the first contextual data with the second contextual data to determine the potential presence of the user in the image data (e.g., if the user is close to the first client device). If the host device determines that the user is potentially present in the image data (e.g., based on a comparison of the first contextual data with the second contextual data), the host device then performs facial recognition on the image data to search this particular user and confirm the presence of this particular user if the facial recognition also returns a positive match. In some instances, if the host device determines that the user is not potentially present in the image data, the host device does not search for the user in the image data. In this manner, the host device can reduce the number of users to search for in a particular media file, and reduce false positives by tying the user's contextual data and the user's appearance to the data obtained from the media.

In some implementations, the host device can perform facial recognition to identify all possible users in the image data. The host device then compares the second contextual data with the first contextual data to determine the potential presence of the user associated with the second user device, after which the host device can determine whether this user associated with the second user device is within the possible users identified from facial recognition. If positive, the host device can then determine that the user is indeed present in the image data.

Once the host device determines that the user associated with the second user device is present in the image data, the host device can send the image data to the user. In some implementations, the image data includes one or more images where the user is present. In some implementations, the image data includes a video stream where the user is present in at least one frame of the video stream.

As used in this specification, the singular forms "a," "an" and "the" include plural referents unless the context clearly dictates otherwise. Thus, for example, the term "a module" is intended to mean a single module or a combination of modules, "a network" is intended to mean one or more networks, or a combination thereof.

As used herein the term "module" refers to any assembly and/or set of operatively-coupled electrical components that can include, for example, a memory, a processor, electrical traces, optical connectors, software (executing in hardware), and/or the like. For example, a module executed in the processor can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor) capable of performing one or more specific functions associated with that module.

The embodiments and methods described herein can use facial recognition data to (1) search for one or more images of a registered user (e.g., a person who's facial recognition data is predetermined) and (2) provide the images (or a video stream including the images) to a client device associated with the user (e.g., a smartphone, tablet, computer, wearable electronic device, etc.). Facial recognition generally involves analyzing one or more images of a person's face to determine, for example, salient features of his or her facial structure (e.g., cheekbones, chin, ears, eyes, jaw, nose, hairline, etc.) and then defining a qualitative and/or quantitative data set associated with and/or otherwise representing the salient features. One approach, for example, includes extracting data associated with salient features of a person's face and defining a data set including geometric and/or coordinate based information (e.g., a three dimensional (3-D) analysis of facial recognition data). Another approach, for example, includes distilling image data into qualitative values and comparing those values to templates or the like (e.g., a two dimensional (2-D) analysis of facial recognition data). In some instances, another approach can include any suitable combination of 3-D analytics and 2-D analytics.

Some facial recognition methods and/or algorithms include Principal Component Analysis using Eigenfaces (e.g., Eigenvector associated with facial recognition), Linear Discriminate Analysis, Elastic Bunch Graph Matching using the Fisherface algorithm, Hidden Markov model, Multilinear Subspace Learning using tensor representation, neuronal motivated dynamic link matching, convolutional neural nets (CNN), and/or the like or combination thereof. Any of the embodiments and/or methods described herein can use and/or implement any suitable facial recognition method and/or algorithm or combination thereof such as those described above.

FIG. 1A is a schematic illustration of a recognition system 100 (e.g., image recognition and/or video recognition) according to an embodiment. In some instances, the recognition system 100 (also referred to herein as "system") can be used to present an image or a video stream of a user based at least in part on facial recognition data. At least a portion of the system 100 can be, for example, represented and/or described by a set of instructions or code stored in a memory and executed in a processor of an electronic device (e.g., a host device, a server or group of servers, a personal computer (PC), a network device, etc.) and/or the like. For example, in some embodiments, a host device can receive a signal associated with a request to register facial recognition data associated with a user and in response, can store the facial recognition data in a database. Similarly, the host device can receive a signal associated with image data (including video stream data). In some instances, one or more processors of the host device can then execute a set of instructions or code, stored in a memory of the host device, associated with analyzing the image data to determine if one or more images of the user are present in the image data based at least in part on the facial recognition data and/or contextual information (e.g., location). If images are found in the image data, the one or more processors can isolate an associated portion of the image data. Moreover, the one or more processors can execute a set of instructions or code to (1) associate contextual data (e.g., time, location, event, etc.) with the image data and (2) define a contextual image of the user. The one or more processors can then send, to the client device associated with the user, a signal indicative of an instruction to present the contextual image of the user on a display of the client device (e.g., by graphically rendering the contextual image in an interface instantiated on the client device). The image can be a contextual image based on contextual data (1) being associated with the image and/or (2) being used to aid in identifying the user in the image.

The system 100 includes a host device 110 in communication with a database 140, a first client device 150a and a second client device 150b (collectively referred to as client devices 150, also referred to as user devices 150), and an image capture system 160. The host device 110 can be any suitable host device such as a server or group of servers, a network management device, a personal computer (PC), a processing unit, and/or the like in electronic communication with the database 140, the client devices 150, and the image capture system 160. For example, in this embodiment, the host device 110 can be a server or group of servers (disposed in substantially the same location and/or facility or distributed in more than one location) in electronic communication with the database 140, the client devices 150, and the image capture system 160 via a network 105, as described in further detail herein.

The client devices 150 can be any suitable device such as a PC, a laptop, a convertible laptop, a tablet, a personal digital assistant (PDA), a smartphone, a wearable electronic device (e.g., a smart watch, etc.), and/or the like. In some embodiments, the client devices 150 include consumer electronics. In some embodiments, the client devices 150 can include any other electronic device that includes at least a memory, a processor, a communication interface, a display, and one or more inputs (see, e.g., FIG. 3 below). For example, the client device 150a/b can include a stadium camera in communication with a computing device located away from the stadium camera. The memory, the processor, the communication interface, the display, and the input(s) can be connected and/or electrically coupled to each other such as to allow signals to be sent therebetween. For example, in some embodiments, the memory can be a random access memory (RAM), a memory buffer, a hard drive, a read-only memory (ROM), an erasable programmable read-only memory (EPROM), and/or the like. The processor can be any suitable processing device configured to run or execute a set of instructions or code (e.g., stored in the memory) such as a general-purpose processor (GPP), a central processing unit (CPU), an accelerated processing unit (APU), a graphics processor unit (GPU), an Application Specific Integrated Circuit (ASIC), and/or the like. Such a processor can run or execute a set of instructions or code stored in the memory associated with using a PC application, a mobile application, an internet web browser, a cellular and/or wireless communication (via a network), and/or the like. More specifically, the processor can execute a set of instructions or code stored in the memory associated with sending facial recognition data to and/or receiving facial recognition data and/or contextual video stream data from the host device 110, as described in further detail herein.

The communication interface of the client devices 150 can be any suitable module and/or device that can place the resource in communication with the host device 110 such as one or more network interface cards or the like. Such a network interface card can include, for example, an Ethernet port, a WiFi® radio, a Bluetooth® radio (e.g., a Bluetooth® antenna), a near field communication (NFC) radio, and/or a cellular radio that can place the client devices 150 in communication with the host device 110 via a network (e.g., the network 105) or the like. As such, the communication interface can send signals to and/or receive signals from the processor associated with electronically communicating with the host device 110 via the network 105. In addition, the communication interface of the client devices 150 can also send and/or receive signals to/from each other, i.e. the first client device 150a is in communication with the second client device 150b. In some instances, the communication interface of the client devices 150 can include multiple communication interfaces (e.g., a WiFi® communication interface to communicate with the host device 110 and a Bluetooth® communication interface to send and/or broadcast signals to other client devices 150).

The display of the client devices 150 can be, for example, a cathode ray tube (CRT) monitor, a liquid crystal display (LCD) monitor, a light emitting diode (LED) monitor, and/or the like that can graphically represent any suitable portion of the system 100 (e.g., a graphical user interface (GUI) associated with a webpage, PC application, mobile application, and/or the like). In some embodiments, such a display can be and/or can include a touch screen configured to receive a haptic user input. In some instances, the display can be configured to graphically represent data associated with a facial recognition process and/or data associated with an image and/or a video stream, as described in further detail herein.

The input(s) of the client devices 150 can be any suitable module and/or device that can receive one or more inputs (e.g., user inputs) and that can send signals to and/or receive signals from the processor associated with the one or more inputs. In some embodiments, the input(s) can be and/or can include ports, plugs, and/or other interfaces configured to be placed in electronic communication with a device. For example, such an input can be a universal serial bus (USB) port, an Institute of Electrical and Electronics Engineers (IEEE) 1394 (FireWire) port, a Thunderbolt port, a Lightning port, and/or the like. In some embodiments, the display can be included in a touch screen or the like configured to receive a haptic user input.

In some embodiments, an input can be a camera and/or other imaging device. For example, in some embodiments, such a camera can be integrated into the client devices 150 (e.g., as in smartphones, tablets, laptops, etc.) and/or can be in communication with the client devices 150 via a port or the like (e.g., such as those described above). The camera can be any suitable imaging device such as, for example, a webcam or a forward facing camera included in a smartphone or tablet (e.g., a camera pointed substantially in the same direction as the display). In this manner, the user can manipulate the client devices 150 to cause the camera to capture an image (e.g., a photo) or a video. Moreover, in some instances, the display can be configured to graphically render data associated with an image and/or video captured by the camera. By way of example, in some embodiments, the client devices 150 can be a smartphone, tablet, or wearable electronic device that includes a forward facing camera. In some instances, a user can manipulate the client devices 150 to take a picture or video of himself or herself via the camera (e.g., also known as a "selfie").

In some instances, a camera (e.g., an input) included in the client devices 150 can be used to capture an image of a user's face, which in turn, can be used to register facial recognition data associated with the user. Specifically, the user can manipulate the client device 150a/b such that the camera captures an image of the user's face. In some instances, the display can be configured to graphically render an indication, frame, boundary, guide, and/or any other suitable graphical representation of data, which can provide an indication to a user associated with a desired alignment for the image of the user's face. Once the camera captures the desired image, the processor can receive and/or retrieve data associated with the image of the user's face and, in turn, can execute a set of instructions or code (e.g., stored in the memory) associated with at least a portion of a facial recognition process. For example, in some instances, the processor can execute a set of instructions or code associated with verifying an alignment between the indication, frame, boundary, etc. graphically rendered on the display and the captured image of the user's face. In some instances, the client device 150a/b can be configured to send, via the network 105, a signal associated with data representing the image of the user to the host device 110 when the alignment is verified, and in response, the host device 110 can perform any suitable facial recognition process or processes on the data, as described in further detail herein.

The image capture system 160 can be and/or can include any suitable device or devices configured to capture image data. For example, the image capture system 160 can be and/or can include one or more cameras and/or image recording devices configured to capture an image (e.g., a photo) and/or record a video stream. In some embodiments, the image capture system 160 can include multiple cameras in communication with a central computing device such as a server, a personal computer, a data storage device (e.g., a network attached storage (NAS) device, a database, etc.), and/or the like. In such embodiments, the cameras can be autonomous (e.g., can capture image data without user prompting and/or input), and can each send image data to the central computing device (e.g., via a wired or wireless connection, a port, a serial bus, a network, and/or the like), which in turn, can store the image data in a memory and/or other data storage device. Moreover, the central computing device can be in communication with the host device 110 (e.g., via the network 105) and can be configured to send at least a portion of the image data to the host device 110. Although shown in FIG. 1A as being in communication with the host device 110 via the network 105, in other embodiments, such a central computing device can be included in, a part of, and/or otherwise coupled to the host device 110. In still other embodiments, the cameras can be in communication with the host device 110 (e.g., via the network 105) without such a central computing device.

In some embodiments, the image capture system 160 can be associated with and/or owned by a venue or the like such as, for example, a sports arena, a theme park, a theater, and/or any other suitable venue. In other embodiments, the image capture system 160 can be used in or at a venue but owned by a different entity (e.g., an entity licensed and/or otherwise authorized to use the image capture system 160 in or at the venue such as, for example, a television camera at a sporting event). In still other embodiments, the image capture system 160 can include any number of client devices (e.g., user devices) or the like such as smartphones, tablets, etc., which can be used as cameras or recorders. In such embodiments, at least some of the client devices can be in communication with the host device 110 and/or a central computing device associated with the venue (e.g., as described above).

Figure 1B:
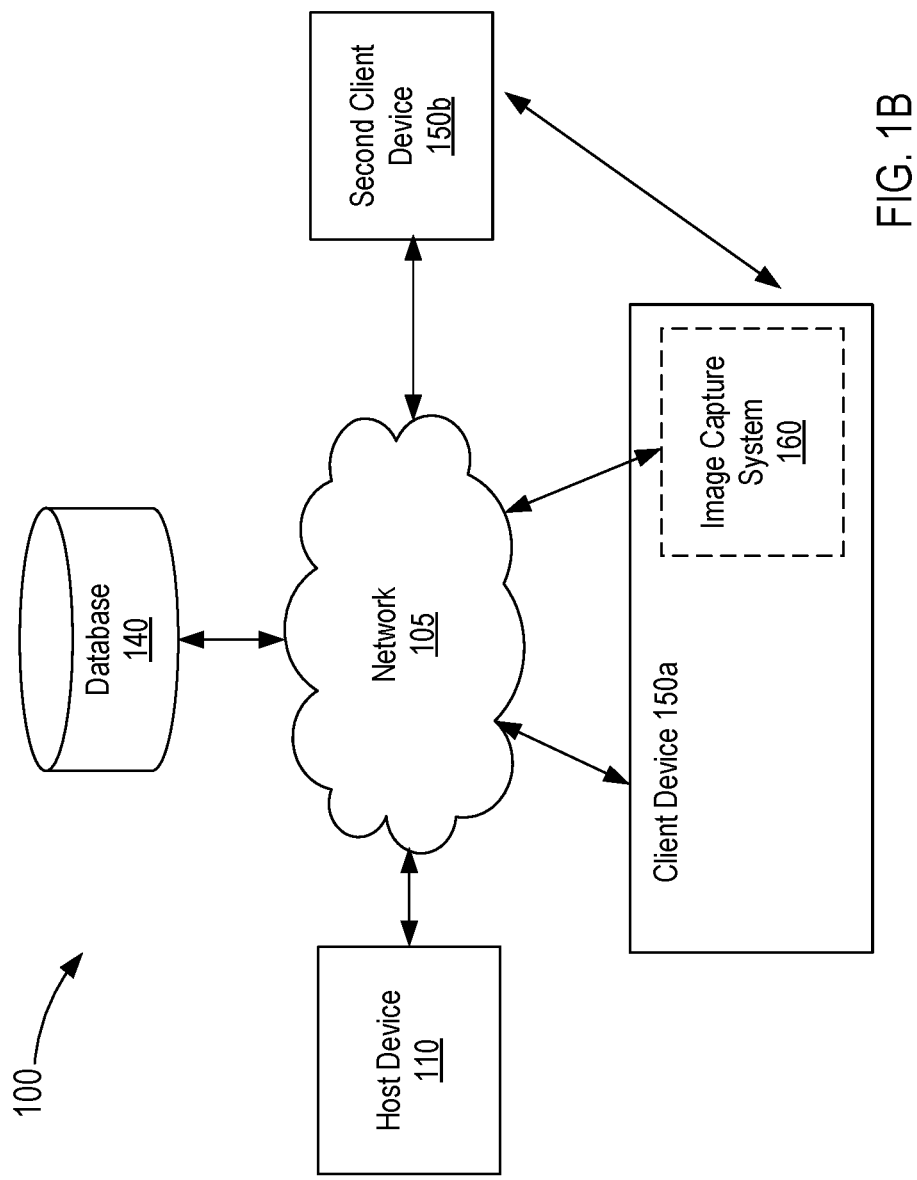
FIG. 1B is a schematic illustration of a recognition system according to another embodiment.

For example, in some embodiments, the camera integrated into the first client device 150a can form and/or be part of at least a portion of the image capture system 160, as shown in FIG. 1B. In this manner, the first user of the first client device 150a can manipulate the first client device 150a to capture a picture and/or video recording and in response, the first client device 150a can upload and/or otherwise send the picture (e.g., image data, photographic data, etc.) and/or video recording data to the host device 110. In some instances, the picture and/or video recording data can be stored on the first client device 150a for any suitable time and uploaded and/or sent to the host device 110 at a later time. Moreover, the picture and/or video recording data can be stored on the first client device 150a after the picture and/or video recording data is sent to the host device 110. That is to say, sending the picture and/or video recording data does not delete and/or remove the picture and/or video recording data from the first client device 150a (e.g., a copy of the data is sent to the host device 110). Thus, as shown in FIG. 1B, the image capture system 160 need not be associated with a particular event and/or venue. In such instances, the first user can manipulate the first client device 150a (e.g., an application of the first client device 150a) to capture user generated content (e.g., pictures, image data, photographic data, video stream data, etc.) via the camera and/or recording device (e.g., the image capture system 160) integrated into the first client device 150a.

In some instances, the image capture system 160 is configured to capture image data associated with a venue and/or event. In other words, the image capture system 160 is configured to capture image data within a predetermined, known, and/or given context. For example, in some instances, the image capture system 160 can include one or more image capture devices (e.g., cameras and/or video recorders) that are installed at an arena or the like and that are configured to capture image data associated with patrons, guests, performers, etc. at the arena. In this manner, the image capture system 160 is configured to capture image data within the context of the arena and/or an event occurring at the arena. Thus, the captured image data can be, for example, "contextual image data." That is to say, the image data is associated with at least some contextual data. As a non-limiting example, the host device 110 can receive the image data and/or video stream data from the image capture system 160 and data associated with the context (e.g., "contextual data" associated with the arena and/or the event occurring at the arena, and/or any other suitable contextual and/or metadata) from any suitable data source and/or the like; can associate the contextual data with, for example, the image data; can define a user-specific contextual image and/or user-specific contextual video stream associated with, for example, a user of the client device 150a/b; and can send the user-specific contextual image and/or user-specific contextual video stream associated with the user to the client device 150a/b. Alternatively and/or additionally, the host device 110 can also receive contextual data from one or more of the user devices 150 as described herein.

As described above, the client devices 150 and the image capture system 160 can be in communication with the host device 110 via one or more networks. For example, as shown in FIG. 1A, the client devices 150 and the image capture system 160 can be in communication with the host device 110 via its communication interface and the network 105. The network 105 can be any type of network such as, for example, a local area network (LAN), a virtual network such as a virtual local area network (VLAN), a wide area network (WAN), a metropolitan area network (MAN), a worldwide interoperability for microwave access network (WiMAX), a cellular network, the Internet, and/or any other suitable network implemented as a wired and/or wireless network. By way of example, the network 105 can be implemented as a wireless local area network (WLAN) based on the Institute of Electrical and Electronics Engineers (IEEE) 802.11 standards (also known as "WiFi®"). Moreover, the network 105 can include a combination of networks of any type such as, for example, a LAN or WLAN and the Internet. In some embodiments, the client devices 150 can communicate with the host device 110 and the network 105 via intermediate networks and/or alternate networks (not shown), which can be a similar to or different from the network 105. As such, the client devices 150 can send data to and/or receive data from the host device 110 using multiple communication modes (e.g., associated with any of the networks described above) that may or may not be transmitted to the host device 110 using a common network. For example, the client devices 150 can be mobile telephones (e.g., smartphones) connected to the host device 110 via a cellular network and the Internet (e.g., the network 105).

In some instances, the network can facilitate, for example, a peer networking session or the like. In such instances, the peer networking session can include, for example, client devices and/or any other suitable electronic device, each of which share a common characteristic. For example, in some instances, the peer networking session can include any suitable client device (e.g., an electronic device registered in the database 140 and/or the like) that is within a predetermined proximity of a venue, event, location, etc. For example, in some instances, such a peer networking session can include any number of registered client devices present at a venue (e.g., a sports event). In some instances, the peer networking session can be automatically established based on contextual data associated with the user and/or the client device. In other instances, the peer networking session can be automatically established based on one or more users "checking-in" and/or otherwise publicizing his or her presence at the venue or the like (e.g., "squawk" the user's presence). In some instances, a user can "check-in" at a time the user arrived at an event or the like (e.g., sports event, concert, wedding, birthday party, gathering, etc.), at a time of registration, at a time of capturing an image or video stream, and/or the like. Further, the "check-in" can include identifying information such as, for example, geo-location data, date and time data, personal or user identification data, etc. In some implementations, a user can also, via an application on their client devices 150, search for events and/or locations for which video stream data has been captured. The user can "check-in" to the event and/or locations that are returned from the search. As described herein, checking into an event and/or location can initiate processing of the video stream data associated with that event and/or location, e.g., to determine whether or not the user can be matched to the image or video stream data.

In other instances, a user can manually establish a peer networking session including, for example, a predetermined set or group of users. In some instances, such peer networking sessions can be public networks, private networks, and/or otherwise limited access networks. For example, in some instances, a user can request to join a networking session and/or can receive an invite to join a networking session and/or the like. In some instances, establishing a peer networking session can, for example, facilitate communication (e.g., group chat sessions or the like) and/or sharing of image and/or video data between users included in the peer networking session.

The host device 110 can be any suitable device configured to send data to and/or receive data from the database 140, the client devices 150, and/or the image capture system 160. In some implementations, the host device 110 can function as, for example, a server device (e.g., a web server device), a network management device, an administrator device, and/ or so forth. In some embodiments, the host device 110 can be a group of servers or devices housed together in or on the same blade, rack, and/or facility or distributed in or on multiple blades, racks, and/or facilities. The host device 110 includes at least a memory 115, a processor 120, and a communication interface 125 (see e.g., FIG. 2). In some embodiments, the memory 115, the processor 120, and the communication interface 125 are connected and/or electrically coupled so that signals can be sent between the memory 115, the processor 120, and the communication interface 125. The host device 110 can also include and/or can otherwise be operably coupled to the database 140 configured to store user data, facial recognition data, contextual data (e.g., associated with a time, location, venue, event, etc.), video streams, and/or the like.

The memory 115 can be, for example, RAM, a memory buffer, a hard drive, a database, a ROM, an EPROM, an EEPROM, and/or so forth. In some instances, the memory 115 of the host device 110 includes a set of instructions or code used to perform one or more facial recognition actions and/or used to communicate (e.g., send and/or receive) data with at least one device (e.g., the client devices 150) using one or more suitable communication modes.

The processor 120 can be any suitable processor such as, for example, a GPP, a CPU, an APU, a GPU, a network processor, a front-end processor, an ASIC, an FPGA, and/or the like. Thus, the processor 120 can be configured to perform and/or execute a set of instructions, processes, modules, and/or code stored in the memory 115. For example, the processor 120 can be configured to execute a set of instructions, processes and/or modules associated with, inter alia, receiving facial recognition data (e.g., from the client devices 150), analyzing the facial recognition data, registering and/or storing the facial recognition data, receiving video stream data (e.g., from the image capture system 160), analyzing the video stream data and comparing the video stream data to the facial recognition data, receiving and comparing contextual data, sending video stream data (e.g., to the client device 150a/b), receiving and/or analyzing characteristics of the video stream data (e.g., location information determined based on such as background landmark and/or background scenery data included in the video stream data, and/or the like), and/or any other suitable process, as further described herein.

The communication interface 125 can be any suitable device that can place the host device 110 in communication with the database 140, the client devices 150, the image capture device 160 and/or any other suitable device and/or service in communication with the network 105 (e.g., any device configured to gather and/or at least temporarily store data such as facial recognition data, video streams, and/or the like). In some embodiments, the communication interface 125 can include one or more wired and/or wireless interfaces, such as, for example, network interface cards (NIC), Ethernet interfaces, optical carrier (OC) interfaces, asynchronous transfer mode (ATM) interfaces, and/or wireless interfaces (e.g., a WiFi® radio, a Bluetooth® radio, an NFC radio, and/or the like).

Returning to FIG. 1A, the database 140 associated with the host device 110 can be any suitable database such as, for example, a relational database, an object database, an object-relational database, a hierarchical database, a network database, an entity-relationship database, a structured query language (SQL) database, an extensible markup language (XML) database, digital repository, a media library, a cloud server or storage, and/or the like. In some embodiments, the host device 110 can be in communication with the database 140 over any suitable network (e.g., the network 105) via the communication interface 125. In such embodiments, the database 140 can be included in or stored by a network attached storage (NAS) device that can communicate with the host device 110 over the network 105 and/or any other network(s). In other embodiments, the database can be stored in the memory 115 of the host device 110. In still other embodiments, the database can be operably coupled to the host device 110 via a cable, a bus, a server rack, and/or the like.

The database 140 can store and/or at least temporarily retain data associated with the recognition system 100. For example, in some instances, the database 140 can store data associated with and/or otherwise representing user profiles, resource lists, facial recognition data, modes, and/or methods, contextual data (e.g., associated with a time, location, venue, event, etc.), video streams or portions thereof, images, location information (such as landmark data), and/or the like. In other words, the database 140 can store data associated with users whose facial image data has be registered by the system 100 (e.g., "registered users"). In some embodiments, the database 140 can be and/or can include a relational database, in which data can be stored, for example, in tables, matrices, vectors, etc. according to the relational model. By way of example, in some instances, the host device 110 can be configured to store in the database 140 image data and/or video stream data received from a video or image source (e.g., the image capture system 160) and contextual data associated with the video stream data. In some instances, the image data and/or the video stream data and the contextual data associated therewith can collectively define a contextual video stream or the like, as described in further detail herein. In other instances, the video stream data can be stored in the database 140 without contextual data or the like. In some instances, the contextual data can be used to reduce false positives associated with the facial recognition process, as described herein.

In some implementations, the user profiles can be user profile data structures that include information relating to users accessing image data. For example, a user profile data structure can include a user profile identifier, facial recognition data (e.g., data obtained from an image of the user (e.g., facial characteristic data) that can be used to match the user to an image from the image data), a list of identifiers associated with image data structures stored in the database 140 and associated with the user, a list of identifiers associated with the user profile data structures of other users with which the user is associated (e.g., as a friend and/or contact), user location data, and/or the like.

In some implementations, users can add each other as friends within an application through which they access image data. Users can also be automatically be associated with each other, e.g., when a user associated with a first user profile is a contact of another user associated with a second user profile. For example, a user operating a client device can have a list of contacts, and/or other contact information, stored at the client device. The application can retrieve and import the contact information, can match the contact information to information in at least one user profile in the database, and can automatically associate that at least one user profile with that user.

In some implementations, the users can be associated with each other by storing a list of friends and/or contacts (e.g., a list of identifiers of user profiles to be added as friends of a particular user) within each user profile of each user. When a user adds a friend and/or contact, the user can automatically be notified when the friend and/or contact records and/or receives image data, video stream data, and/or the like. In some implementations, the host device 110 can also use the stored relationships between users to automatically process image data and/or video stream data associated with the user (e.g., to determine whether friends and/or contacts of the user can be found within the image data and/or video stream data). For example, when the image data is received, when a friend and/or contact is associated with the user, and/or the like, the host device 110 can automatically process the image data to determine whether facial image data associated with the friends and/or contacts of the user can be matched to the image data.

Although the host device 110 is shown and described with reference to FIG. 1 as including and/or otherwise being operably coupled to the database 140 (e.g., a single database), in some embodiments, the host device 110 can be operably coupled to any number of databases. Such databases can be configured to store at least a portion of a data set associated with the system 100. For example, in some embodiments, the host device 110 can be operably coupled to and/or otherwise in communication with a first database configured to receive and at least temporarily store user data, user profiles, and/or the like and a second database configured to receive and at least temporarily store image data and/or video stream data and contextual data associated with the image data and/or video stream data. In some embodiments, the host device 110 can be operably coupled to and/or otherwise in communication with a database that is stored in or on the client device 150 and/or the image capture system 160. Similarly stated, at least a portion of a database can be implemented in and/or stored by the client devices 150 and/or the image capture system 160. In this manner, the host device 110 and, in some instances, the database 140 can be in communication with any number of databases that can be physically disposed in a different location than the host device 110, while being in communication with the host device 110 (e.g., via the network 105).

In some embodiments, the database 140 can be a searchable database and/or repository. For example, in some instances, the database 140 can store image data and/or video stream data associated with a user (e.g., contextual video stream data). In some instances, the user can search the database 140 to retrieve and/or view one or more images and/or video streams associated with the user that are stored in the database 140. In some instances, the user can have a limited access and/or privileges to update, edit, delete, and/or add images and/or video streams associated with his or her user profile (e.g., user-specific contextual video streams and/or the like). In some instances, the user can, for example, update and/or modify permissions and/or access associated with the user-specific images and/or video streams associated with that user. For example, in some instances, the user can redistribute, share, and/or save data associated with the user. In other instances, the user can block access to user-specific data and/or the like. In some instances, the user can redistribute and/or share content, data, images, and/or video streams otherwise shared with the user (e.g., that may or may not be associated with the user).

Figure 2:
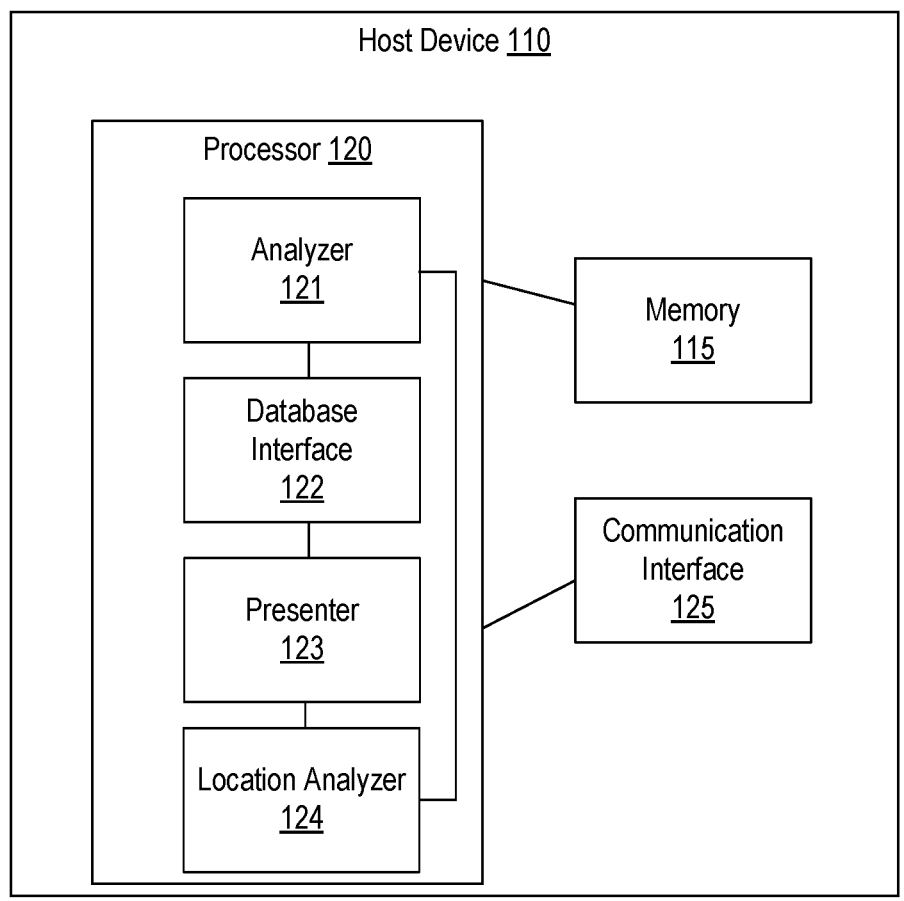
FIG. 2 is a schematic illustration of a host device included in the recognition system of FIGS. 1A and 1B.

Returning to FIG. 2, as described above, the processor 120 of the host device 110 can be configured to execute specific functions or instructions. The functions can be implemented in, for example, hardware, software stored in the memory 115 and/or executed in the processor 120, and/or any combination thereof. For example, as shown in FIG. 2, the processor 120 includes an analyzer 121 (e.g., to execute analysis functions), a database interface 122 (e.g., to execute database functions), a presenter 123 (e.g., to execute presentation functions), and a location analyzer 124 (e.g., to execute location functions). As shown in FIG. 2, the analyzer 121, the database interface 122, the presenter 123, and the location module can be connected and/or electrically coupled. As such, signals can be sent between the analyzer 121, the database interface 122, the presenter 123, and the location analyzer 124.

The analyzer 121 includes a set of instructions that can be executed by the processor 120 (or portion thereof) that are associated with receiving and/or collecting data associated with a facial recognition of a user, an image and/or a video stream. More particularly, the analyzer 121 can be operably coupled to and/or otherwise in communication with the communication interface 125 and can receive data therefrom. Such data can be, for example, associated with a user (e.g., facial recognition information, profile information, preferences, activity logs, location information, contact information, calendar information, social media activity information, etc.), a venue (e.g., location data, resource data, event schedule), an event, and/or the like. As described in further detail herein, the analyzer 121 can receive a signal from the communication interface 125 associated with a request and/or an instruction to perform and/or execute any number of processes associated with facial recognition.

In some instances, the analyzer 121 can receive data from the communication interface 125 in substantially real-time. That is to say, in some instances, an electronic device included in the system 100 (e.g., the client device 150) can be manipulated by a user to define and/or update data associated with facial recognition of the user and once defined and/or updated can send the data to the host device 110 via the network 105. Thus, the communication interface 125 can, upon receiving the data, send a signal to the analyzer 121, which receives the data in a very short time period after being defined and/or updated by the electronic device. In other embodiments, the analyzer 121 can receive data from the communication interface 125 at a predetermined rate or the like based on, for example, an aggregation process, a current and/or predicted processor, memory, and/or network load, and/or the like.

As described above, the analyzer 121 can be configured to receive, aggregate, analyze, sort, parse, alter, and/or update data associated with a facial recognition process or the like. More particularly, in some instances, a user can manipulate the client device 150*a/b* to capture one or more images or video streams of his or her face (as described in further detail herein) and, in turn, can send signals associated with and/or representing the image data to the host device 110, for example, via the network 105. In some instances, the communication interface 125 can receive the image data and can send an associated signal to the analyzer 121. Upon receipt, the analyzer 121 can execute a set of instructions or code (e.g., stored in the analyzer 121 and/or in the memory 115) associated with aggregating, analyzing, sorting, updating, parsing, and/or otherwise processing the image data. More specifically, the analyzer 121 can perform any suitable facial recognition process and/or algorithm such as, for example, Principal Component Analysis using Eigenfaces (e.g., Eigenvector associated with facial recognition), Linear Discriminate Analysis, Elastic Bunch Graph Matching using the Fisherface algorithm, Hidden Markov model, Multilinear Subspace Learning using tensor representation, neuronal motivated dynamic link matching, convolutional neural nets (CNN), and/or the like or combination thereof. In some implementations, image data the user provides to the host device 110 can be used in subsequent facial recognition processes to identify the user, via the analysis section 121.

The analyzer 121 can define a user profile or the like that includes the user's image data, and any other suitable information or data associated with the user such as, for example, a picture, video recording and/or audio recording, personal and/or identifying information (e.g., name, age, sex, birthday, hobbies, etc.), calendar information, contact information (e.g., associated with the user and/or the user's friends, family, associates, etc.), device information (e.g., a media access control (MAC) address, Internet Protocol (IP) address, etc.), location information (e.g., current location data and/or historical location data), social media information (e.g., profile information, user name, password, friends or contacts lists, etc.), and/or any other suitable information or data. As such, the analyzer 121 can send a signal to the database interface 122 indicative of an instruction to store the user profile data in the database 140, as described in further detail herein.

In some instances, the analyzer 121 can receive video stream data (or image data, for example, from a photograph) and can be configured to analyze and/or process the image data and/or the video stream data to determine if a portion of the image data and/or the video stream data matches any suitable portion of users' image data. That is to say, the analyzer 121 can use previously-stored user image data as a template against which data included in the image and/or video stream is compared. Said another way, the analyzer 121 performs a facial recognition process and/or analysis on the image data and/or the video stream data based at least in part on the previously-stored user image data. In some embodiments, the host device 110 and more particularly, the communication interface 125 receives the image data and/or the video stream data from the image capture system 160 either directly (e.g., from one or more cameras via the network 105) or indirectly (e.g., from a computing device via the network 105, which in turn, is in communication with the one or more cameras). In some embodiments, the analyzer 121 can be configured to analyze and/or process the video stream data based at least in part on separating, parsing, sorting, and/or otherwise deconstructing the video stream data into its individual frames (e.g., a static image at a predetermined time during the video stream). As such, the analyzer 121 can compare and/or analyze data included in the video stream frame relative to the previously-stored user image data.

In some instances, the analyzer 121 can also analyze the image data and/or the video stream data to determine contextual information associated with the image data and/or the video stream such as, for example, location, venue, time, coinciding event (e.g., a sports team scoring a goal, being captured, for example, on a "kiss cam," etc.), and/or any other suitable contextual information. In some instances, the analyzer 121 can be configured to match, aggregate, and/or otherwise associate at least a portion of the image data and/or the video stream to the contextual data. For example, in some instances, the image data and/or the video stream data can represent, for example, a user at a sporting event. In such instances, the contextual data can be, for example, a video stream of the sporting event or game, and can include data associated with a time, location, venue, teams, etc. As such, the analysis section 121 can be configured to aggregate the image data and/or the video stream data and the contextual data such that the video stream data and the contextual data substantially coincide (e.g., occur and/or capture data associated with substantially the same time). In other instances, the contextual data can include data associated with any other suitable context. In some instances, the analyzer 121 can be configured to use the contextual information associated with the image data and/or the video stream, along with data relating to the location of a user, to further connect the image data and/or the video stream to a particular user. The analyzer 121 can be configured to compare the contextual information to a user's location prior to comparing data included in the video stream to the previously-stored user image data.

If the analyzer 121 determines that at least a portion of the data in the image data and/or the video stream satisfies a criterion (e.g., matches the previously-stored user image data to a predetermined and/or acceptable probability), the analyzer 121 can send one or more signals to the database interface 122 indicative of an instruction to store at least the portion of the image and/or video stream data in the database 140 and to associate and/or otherwise store that data with the previously-stored user image data. In some instances, the analyzer 121 can send signals to the database interface 122 such that individual frames are stored in the database 140, which in turn, can be subsequently retrieved and processed to define a video stream. In other instances, the analyzer 121 can send one or more signals to the database interface 122 such that the portion of the video stream data is stored in the database 140. That is to say, the analyzer 121 can at least partially redefine and/or reconstruct the video stream from the individual frames (that were separated or deconstructed as described above).

In some instances, the host device 110 can receive image data (e.g., from the image capture system 160 and via the network 105 and the communication interface 125) and the analyzer 121 and/or any other suitable module not shown in FIG. 2, can perform one or more pre-processing and/or pre-sorting procedures prior to performing the facial recognition process (described above). For example, in some embodiments, the analyzer 121 (or other module) can analyze the video stream data to determine and/or define a data set including, for example, identifying information and/or contextual information such as location, time, event, image and/or video identifier, etc. Once defined, the analyzer 121 can analyze user data stored in the database 140 (e.g., via sending a signal to the database interface 122 indicative of an instruction to query the database 140 and/or the like) to determine if a portion of data associated with a user satisfies a criteria(ion) such as matching the data set including the contextual information associated with the image data.

In some instances, the criteria(ion) can be associated with a confidence level and/or matching threshold, represented in any suitable manner (e.g., a value such as a decimal, a percentage, and/or the like). For example, in some instances, the criteria(ion) can be a threshold value or the like such as a 70% match of the image data and at least a portion of the data stored in the database, a 75% match of the image data and at least a portion of the data stored in the database, a 80% match of the video image and at least a portion of the data stored in the database, a 85% match of the image data and at least a portion of the data stored in the database, a 90% match of the image data and at least a portion of the data stored in the database, a 95% match of the image data and at least a portion of the data stored in the database, a 97.5% match of the image data and at least a portion of the data stored in the database, a 99% match of the image data and at least a portion of the data stored in the database, or any percentage therebetween.

In some instances, the data associated with the user can include, for example, calendar data, location data, preference data, and/or the like. If, for example, the data does not satisfy the criterion, the analyzer 121 can define an indication that the data associated with that user can be excluded from, for example, the facial recognition process. In this manner, the pre-processing and/or pre-sorting can reduce an amount of processing load or the like during the facial recognition process. Although described above as querying the database 140 for the user data, in some embodiments, the host device 110 can send a signal to a device associated with the user (e.g., the client device 150a/b) indicative of a request for location data or the like associated with that device. Upon receipt of the location data (e.g., global positioning service (GPS) data of the device, using location information and/or characteristics, such as landmark and/or background scenery, within an image or video, etc.) or the like, the analyzer 121 can determine if the location data matches the location data associated with the video stream, as described above.

By way of example, in some instances, analyzer 121 can receive image data (including video stream data) from a sporting event that also includes location data associated with, for example, an arena. In response, the analyzer 121 can send a request for location data from a client device (e.g., the client device 150) associated with a user. If, for example, the location data associated with the image data and the location data associated with the client device are substantially similar (e.g., the location data associated with the image data and the location data associated with the client device indicate that the source of the image and the client device are and/or were within a predetermined distance of each other) and/or the location data associated with the client device is within a predetermined range of location data values or the like, the analyzer 121 can increase a confidence score and/or otherwise consider the result as contributing to meeting the threshold and/or otherwise satisfying the criteria(ion).

The location data can be, for example, geo-location data based on a GPS, network location and/or data (e.g., via NFC verification, Bluetooth verification, cellular triangulation, cognitive network switching and/or protocols, etc.), social network data such as a "check-in", and/or the like. For example, the location analyzer 124 can process the location data so as to identify the location of the video stream and/or the user, and to provide data to the analyzer 121 so as to allow the analyzer 121 to modify the confidence score. In this manner, the confidence score can be calculated based on the location data.

In other implementations, the location analyzer 124 can process the location data and can provide the processed location data to the analyzer 121 when location data associated with the image and location data associated with the user are substantially similar (e.g., the location data associated with the image and the location data associated with the client device indicate that the source of the video stream and the client device are and/or were within a predetermined distance of each other). The analyzer 121 can then generate and/or modify a confidence score based on the location data and a facial recognition analysis of the image. In this manner, the confidence score may be generated and/or modified when the location data associated with the image and location data associated with the user are determined to be substantially similar and may not be generated and/or modified when the location data associated with the image and location data associated with the user are not substantially similar. Further, in this manner, the confidence score can be calculated as a result of both a location data analysis and a facial recognition analysis. In this manner, the host device 110 (e.g., via the analyzer 121) can determine, for example, a proximity of a client device to a location where the video stream data was captured.

In some implementations, the analysis section 121 can generate and/or modify the confidence score based on ID information associated with the image data received by the host device 110. For example, the analysis section 121 can compare the ID information contained in the second contextual data (e.g., from second user device 150*b*) with the ID information contained in the first contextual data (e.g., from first user device 150*a*). If the ID information matches each other, the host device 110 can determine that the second contextual data was generated in response to receiving a wireless signal from the first user device and that was sent by the first user device in response to generating the image data and further determine that the potential presence of the second user in the image data. The host device 110 can further modify the confidence score using facial recognition. For example, the analysis section 121 can compare the image data against the facial recognition data of the second user. If the host device 110 finds a match in the image data, the host device 110 can increase the confidence score. If the host device 110 does not find a match in the image data, the host device can decrease the confidence score.

Although described as analyzing location data, in other instances, the analyzer 121 can analyze data associated with any suitable source, activity, location, pattern, purchase, etc. For example, in some instances, the analyzer 121 can analyze ticket sales associated with a venue. In other instances, the analyzer 121 can analyze social media posts, comments, likes, etc. In some instances, the analyzer 121 can collect and/or analyze data associated with a user (as described above) and can define, for example, a user profile that can include, inter alia, user identification data, facial recognition data, client device data, purchase data, internet web browsing data, location data, social media data, preference data, etc. Thus, a user's profile data can be analyzed to determine a confidence score, value, and/or indicator, which can be evaluated relative to a threshold score, value, and/or indicator to determine if the user data and/or the video stream data satisfy the criteria(ion). Accordingly, in such embodiments, non-facial recognition data (e.g., ticket sales data, social media posts, and/or characteristics such as a wardrobe of an individual in a video or image, location data such as landmarks within the image, background scenery data, etc.) can be used to corroborate the facial recognition data and/or increase/decrease a confidence score.

Although the analyzer 121 is described above as analyzing the image data to define facial recognition data and contextual data associated with the image, in other embodiments, the facial recognition process and the contextual data process can be performed separately and/or independently. For example, in some embodiments, the analyzer 121 can be configured to perform the facial recognition process while a different module, processor, device, server, etc. can be configured to perform the contextual data process. For example, the location analyzer 124 can perform analysis of the image and/or video stream based on location data, characteristics of the image, and/or the like. Thus, a time to analyze the video stream data can be reduced and/or the processing load can be distributed when compared to the facial recognition process and the contextual data process being performed by the same module.

As described above, the database interface 122 includes a set of instructions executed by the processor 120 (or portion thereof) that is associated with monitoring the database 140 and/or updating data stored therein. For example, the database interface 122 can include instructions to cause the processor 120 to update data stored in the database 140 with at least a portion of the facial recognition data received from the analyzer 121. More specifically, the database interface 122 can receive, for example, the user image data associated with the user from the analyzer 121 and, in response, can store the user image data in the database 140. In some instances, the database interface 122 can receive a signal from the analyzer 121 indicative of a request to query the database 140 to determine if the data stored in the database 140 and associated with the user image data for the user matches any suitable portion of the video stream data and/or image data, as described above. If, for example, at least a portion of the video stream data and/or image data satisfies a criteria(ion) (referred to henceforth as "criterion" for simplicity and not to the exclusion of multiple "criteria"), the database interface 122 can be configured to update the data stored in the database 140 associated with that user. That is to say, if at least a portion of the video stream data and/or image data matches the previously provided user image data within a predetermined probability or the like. If, however, the video stream data and/or image data does not match the previously provided user image data stored in the database 140, the database interface 122 can, for example, query the database 140 for the next entry (e.g., data associated with the next user) and/or can otherwise not update the database 140. Moreover, the database interface 122 can be configured to store the data in the database 140 in a relational-based manner (e.g., the database 140 can be a relational database and/or the like) and/or in any other suitable manner.

The presenter 123 includes a set of instructions executed by the processor (or a portion thereof) that is associated with defining a contextual image and/or presentation representing at least a portion of the image data satisfying the criterion during the facial recognition process, as described above. More specifically, the presenter 123 can be configured to define a contextual image and/or presentation representing an identified user (e.g., via facial recognition) at an event, venue, location, and/or the like. Once the contextual image is defined, the presenter 123 can send a signal associated with the contextual image to the communication interface 125, which in turn, can send a signal (e.g., via the network 105) to the client device 150*a/b* that is indicative of an instruction to graphically render the contextual image and/or video stream on its display.

Although the presenter 123 and/or other portion of the host device 110 is described above as sending a signal to the client device 150*a/b* indicative of an instruction to present the contextual image on the display of the client device 150*a/b*, in other instances, the presenter 123 can define the contextual image and can send a signal to the database interface 122 indicative of an instruction to store the contextual image in the database 140. In such instances, the data associated with the contextual image can be stored and/or otherwise associated with the user data stored in the database 140.

In some instances, the host device 110 can retrieve the contextual image from the database 140 in response to a request from the client device 150*a/b* (and/or any other suitable device). More specifically, in some embodiments, the user can manipulate the client device 150*a/b* to access a webpage on the Internet. After being authenticated (e.g., entering credentials or the like) the user can interact with the webpage such that a request for access to the contextual image is sent from the client device 150*a/b* to the host device 110. Thus, the host device 110 (e.g., the database interface 122) can retrieve the contextual image from the database 140 and can send a signal to the client device 150*a/b* operable in presenting the contextual image on the display (e.g., by rendering the contextual image via the Internet and the webpage). In other words, the contextual image can be stored on the "cloud" and accessed via a web browser and the Internet.

Although the analyzer 121, the database interface 122, and the presenter 123 are described above as being stored and/or executed in the host device 110, in other embodiments, any of the modules can be stored and/or executed in, for example, the client device 150 and/or the image capture system 160. For example, in some embodiments, the client devices 150 can include, define, and/or store a presentation module (e.g., as a native application). The presentation module can be substantially similar to or the same as the presenter 123 of the host device 110. In such embodiments, the presentation module of the client devices 150 can replace the function of the presenter 123 otherwise included and/or executed in the host device 110. Thus, the presentation module of the client devices 150 can receive, for example, a data set associated with a contextual image and upon receipt, can define a presentation to be presented on the display of the client devices 150.

Figure 3:
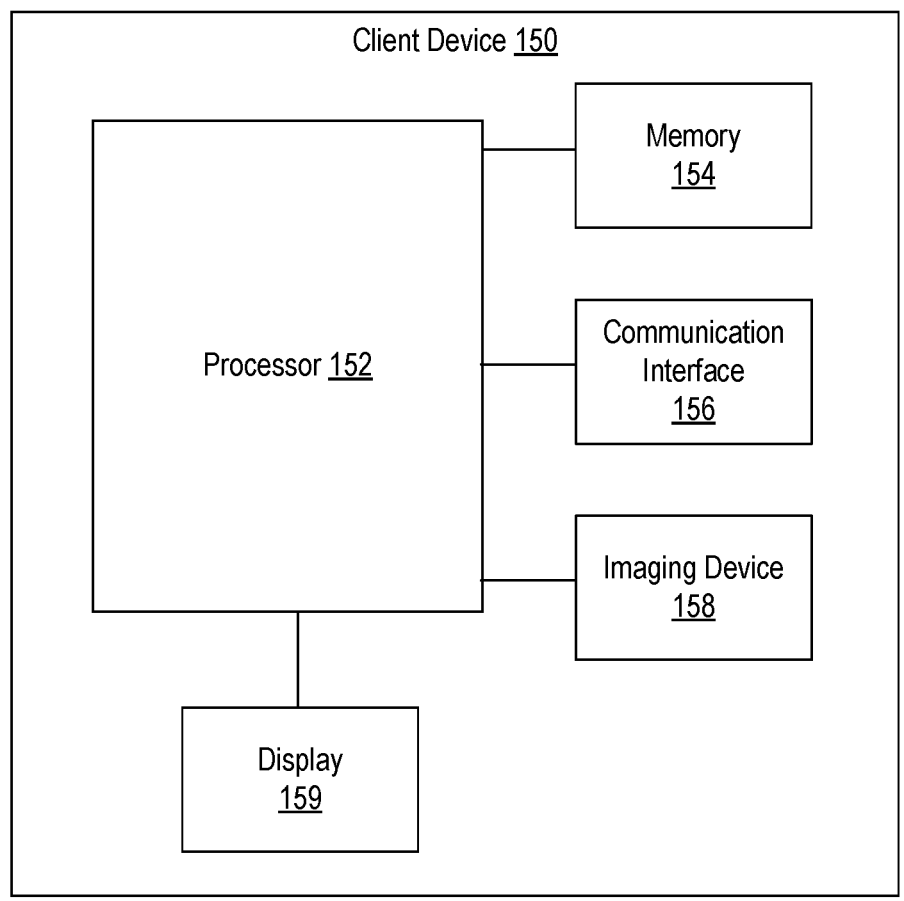
FIG. 3 is a schematic illustration of a client device included in the recognition system of FIGS. 1A and 1B.

FIG. 3 is a schematic illustration of a client device 150 included in the recognition system of FIGS. 1A and 1B. The client device 150 includes a processor 152 operably coupled to a memory 154, a communication interface 156, an optional imaging device 158, and an optional display 159. The client device 150 can be configured either as the first client device 150a or the second client device 150b.

In some implementations, the first client device 150a and the second client device 150b can be interchangeable. For example, a first user using the first client device 150a can take an image of the field of view including the second user using the second client device 150b, and the host device 110 can identify the second user in the image data based on methods described herein and send the image data to the second user. On the other hand, the second user using the second client device 150b can also take an image of the field of view including the first user, and the host device 110 can identify the first user in the image data and send the image data to the first user.

When configured as the first client device in the recognition system 100, the client device 150 includes the imaging device 158 configured to generate image data representative of a field of view. The communication interface 156 is also in communication with the imaging device 158 and configured to communicate via a network (e.g., network 105). In some instances, in response to the imaging device 158 generating the image data, the processor 120 is configured to control the communication interface 156 to broadcast a wireless signal covering at least a portion of the field of view. The wireless signal includes at least a portion of first contextual data associated with the image data. The processor 152 is also configured to control the communication interface 156 to send the image data and the first contextual data associated with the image data to a server (e.g., host device 110) via the network such that, in response to receiving the image data, the server determines a potential presence of a user in the image data based on comparing the first contextual data with second contextual data associated with the user of a second user device and generated in response to the second user device receiving the wireless signal. The server also analyzes the image data based on at least one of two-dimensional facial recognition analytics, three-dimensional facial recognition analytics, or a convolutional neural network (CNN) to identify the user in the image data.

When configured as the second client device in the recognition system 100, the client device 150 includes the communication interface 156 and the processor 152. The processor is configured to control the communication interface 156 to receive, from a first device, a wireless signal including first contextual data associated with image data generated by an imaging device associated with the first device. The first device is further configured to send the image data and the first contextual data to a server. In response to receiving the first contextual data, the processor 152 is configured to control the communication interface 156 to send second contextual data to the server such that in response to receiving the second contextual data, the server determines a potential presence of a user in the image data based on comparing the first contextual data with the second contextual data. The server also analyzes the image data based on at least one of two-dimensional facial recognition analytics, three-dimensional facial recognition analytics, or a convolutional neural network (CNN) to identify the user in the image data. The processor 152 in the client device 150 is also configured to receive the image data from the server in response to the server identifying the user in the image data. The processor 152 can further control the display 159 to display the received image data.

With the apparatus and systems shown in FIGS. 1A-3, various methods of image analysis can be implemented. Some example methods are described below with references to FIGS. 4-6.

Figure 4:
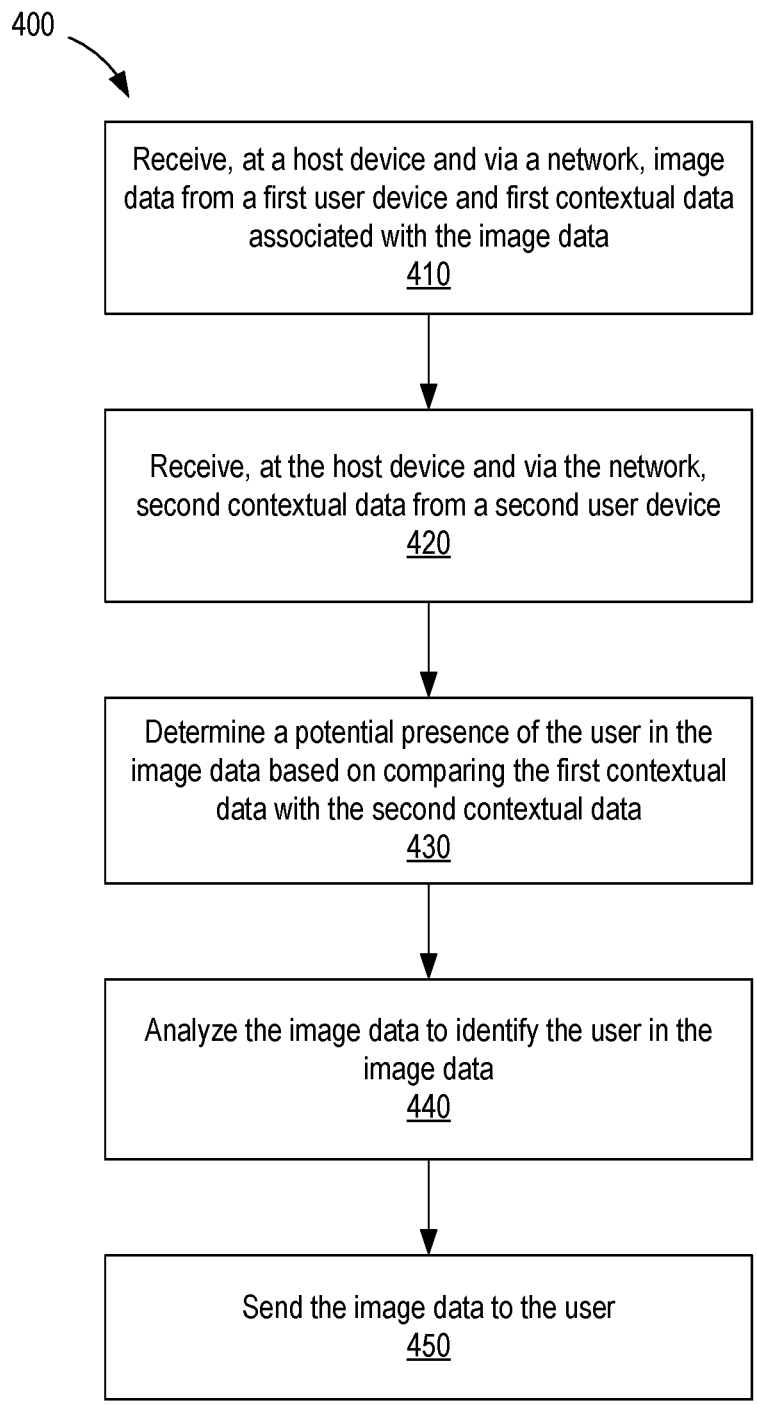
FIG. 4 is a flowchart illustrating a method of using a host device in a video recognition system according to an embodiment.

FIG. 4 is a flowchart illustrating a method 400 of using a host device in a recognition system shown in FIGS. 1A and 1B, according to an embodiment. In the method 400, the host device (e.g., host device 110) receives image data from a first user device that can include an image capture system such as the image capture system 160 (e.g., a camera and/or client device) described above with reference to FIGS. 1A and 1B, at 410. The host device also receives first contextual data associated with the image data. More specifically, the host device can receive the image data either directly (e.g., from one or more cameras via the network) or indirectly (e.g., from a computing device via the network, which in turn, is in communication with the one or more cameras).

The image data includes at least one image of a field of view. The field of view (e.g., a scene captured by the image capture system in the at least one image) can include various types of venues, such as sporting events, concerts, rallies, graduations, summer camps, or any other suitable situations. In some instances, for example, the image data can be captured and/or taken by a user of a first user device (e.g., 150a). The user can be an attendee of an event. In other instances, the image data can be captured and/or taken by the host of the event. For example, the image data can be captured and/or taken by one or more fixed cameras installed and/or controlled by the host of the event. In another example, the image data can be captured and/or taken by one or more photographers associated with the event (e.g., hired by the host). In some instances, the image data can be captured and/or taken by a third party, such as a camera associated with a television station.

In one example, a camera can record the image data, and can send the image data to the host device. In another example, a user can record image(s) through an application running on a client device (e.g., first client device 150a) operated by the user (e.g., via a User-Generated Content (UGC) interface within the application running on the client device). By initiating recording through the application (e.g., by clicking a "Capture", "Record" and/or similar button in the UGC interface), the user can capture and/or record one or more images, with which the client device can associate first contextual data. The contextual data can include, for example, location data (e.g., geolocation data, data from Near Field Communication (NFC), data from Bluetooth communications with other devices, cellular triangulation, event and/or location check-in data, and/or network Wi-Fi connection information), timing data (e.g., from a clock operably coupled with the image capture system), ID data (e.g., serial number generated by the client device for each image or video) and/or the like. As an example, the host device can tag the image with the location data, timing data, and/or ID data, and/or can associate the image with a data structure encapsulating the location data, timing data and/or ID data.

At 420, the host device receives second contextual data from a second user device (e.g., 150b in the system 100). The second contextual data can be associated with a user of the second user device or the second user device itself. The second contextual data is generated in response to the user device receiving a wireless signal, which is sent, in response to the imaging device generating the image data, by an antenna operably coupled to the imaging device. The wireless signal can be based on any suitable wireless technology, such as, for example, WiFi®, Bluetooth®, radio frequency (RF), 3G, 4G, 5G, optical communication, and/or infrared communication, among others.

In some implementations, the second user device receives the wireless signal via one protocol (e.g., Bluetooth) and sends the second contextual data to the host device via another protocol (e.g., WiFi). In some embodiments, the second device uses the same protocol to receive the wireless signal and send the second contextual data.

The wireless signal can cover at least a portion of the field of view of the image data. Similarly stated, the wireless signal can be broadcast such that user devices (such as the second user device) within a proximity of the first user device can receive the wireless signal. In some implementations, the wireless signal is broadcast by the first user device such that the wireless signal is sent to an area surrounding the first user device. In some other implementations, the wireless signal is directed toward the field of view. The directed wireless signal can reduce the number of user devices that might receive the wireless signal and thus send contextual data to the host device, and accordingly increase the accuracy of the subsequent facial recognition by reducing the number of possible users in the image data. Similarly stated, because the wireless signal that triggers the second user device to send second contextual data to the host device is directed toward the same field of view of the image data, as long as the host device receives second contextual data from a user device, the chance that the user of the user device is within the image data is high.

In some implementations, the first user device includes a camera associated with a venue. In these instances, the camera can be operably coupled to an antenna (or a computing device including an antenna). When the camera takes an image or a video, the antenna is configured to send out the wireless signal. For example, a controller, such as a control station or console, can be used to control both the camera and the antenna, in which case the instruction sent to the camera to capture an image or a video is also employed to control the antenna to send out the wireless signal. In another example, the camera can include a communication interface to communicate with the antenna (or the computing device). When the camera captures an image or a video, the communication interface is configured to send a signal to the antenna (or the computing device), causing the antenna to send out the wireless signal.

At 430, the host device determines a potential presence of the user in the image data based on comparing the first contextual data with the second contextual data. The comparison between the first contextual data and the second contextual data can be carried out in multiple implementations.

In some implementations, for example, in response to receiving the wireless signal from the first user device, the second user device sends the second contextual data including identification (ID) information associated with the image data, the user and/or the second user device to the host device and a second timestamp. The second timestamp can be, for example, the time of receiving the wireless signal or the time of sending the second contextual data. The first contextual data sent by the first user device includes a first timestamp representing the time of generating the image data. By comparing the two timestamps, the host device can determine whether the user is potentially present in the image data.

In other implementations, for example, the first and second contextual data can include first and second location information representing the locations of the first user device and the second user device, respectively. By comparing the first location information with the second location information, the host device can also determine the likelihood that the user is present in the image data.

In yet another example, the wireless signal sent by the first user device can include ID information associated with the image data and/or the first user device (e.g., a serial number). In response to receiving the wireless signal, the second user device can forward at least part of the ID information to the host device. The first user device also sends the same ID information to the host device (e.g., contained in the first contextual data). The host device can then determine the likelihood of the user's presence in the image data based on whether the ID information in the second contextual data matches the ID information in the first contextual data.

In some implementations, both the first contextual data and the second contextual data can be sent to the host device by the second user device. For example, the wireless signal can include the first contextual data and the second user device then forwards this first contextual data (together with the second contextual data or as part of the second contextual data) to the host device. The first contextual data can include ID information associated with the first user device and/or the image data. The host device can then determine that the second user device is in proximity of the first user device based on the fact that ID information associated with the first user device and/or the image data is contained in data from the second user device.

At 440, the host device analyzes the image data to identify the user in the image data. In some instances, the host device can analyze the image data based on and/or using at least one of two-dimensional facial recognition analytics, three-dimensional facial recognition analytics, or a convolutional neural network (CNN) to identify the user in the image data. For example, the host device can receive the image data and can analyze and/or process the image data to determine if a portion of the image data matches any suitable portion of facial image data stored in the database (e.g., database 140). That is to say, the host device can use the facial image data as a template against which the image data is compared.

In some instances, a criterion of a positive facial recognition can be, for example, associated with a matching of the image data with the facial image data with a predetermined and/or acceptable probability. In some embodiments, the image data includes a video stream, and the host device can be configured to analyze and/or process the video stream based at least in part on separating, parsing, sorting, and/or otherwise deconstructing the video stream into its individual frames (e.g., a static image at a predetermined time during the video stream). As such, the host device can compare and/or analyze data included in the video stream frame relative to the facial image data.

The facial recognition at 440 performed by the host device can be either before or after the comparison of the first contextual data with the second contextual data at 430. In other words, the order of 430 and 440 can be freely arranged.

In some implementations, the host device compares the first contextual data with the second contextual data to determine the potential presence of the user in the image data (e.g., if the user is close to the first client device). The host device then performs facial recognition on the image data to search for this particular user. The host device can confirm the presence of this particular user if the facial recognition also returns a positive match. In this manner, the host device can reduce the number of users to search for in a particular media file, and reduce false positives by tying the user's contextual data and the user's appearance to the data obtained from the media. In some implementations, the host device does not perform facial recognition to search for users (or any person) who are not identified based on the comparison of the first contextual data with the second contextual data (e.g. from step 430). In such implementations, processing at the host device can be reduced. False positives associated with the facial recognition analysis can also be reduced.

In other implementations, the host device can perform facial recognition to identify the possible users in the image data prior to comparing contextual data. The host device then compares the second contextual data with the first contextual data to determine the potential presence of the user associated with the second user device, after which the host device can determine whether the user associated with the second user device is within the possible users identified from facial recognition. If positive, the host device can then determine that the user is indeed present in the image data.

At 450, the host device sends the image data to the user. The image data sent to the user is also referred to as a "contextual image" because the user is identified based at least in part on contextual data, as described herein. Similarly, if the image data includes a video stream, the video stream sent to the user is referred to as a "contextual video steam" because the user is identified based at least in part on contextual data, as described herein. A contextual image of the user is defined when the criterion associated with facial recognition of the facial image data in the image data is satisfied. For example, when the host device determines that at least a portion of the data in the image data satisfies a criterion (e.g., matches the facial image data to a predetermined and/or acceptable probability), the host device can define the contextual image of the user and can store the contextual image of the user in the database. With the contextual image of the user defined, the host device sends the image data to the user, at 450. For example, the host device can send a signal indicative of an instruction to present the contextual image of the user on a display of the client device (e.g., by graphically rendering the contextual image in an interface instantiated on the client device 150*b*). In some instances, the host device can send a signal to the client device, via the network, that is operable in presenting the contextual image of the user on the display of the client device.

In some instances, the host device can also send a message to the first user who took the image data indicating that one or more other users were identified in the image data. The host device can also suggest the second user adding the identified users as friends on one or more social media platforms.

In some instances, the host device can also ask the second user to identify and/or confirm the presence of users in the image data. For example, in the event that host device does not recognize a person in the image data, the host device can ask the first user for suggestions of possible identities of that person. In another example, in the event that the host device recognizes a person in the image data but the confidence level does not meet a criterion (e.g., is not above a threshold), the host device can ask the first user to confirm the tentative recognition.

In other instances, the host device can store the contextual image (e.g., in the database or the like) and can be configured to retrieve the contextual image of the user from the database in response to a request from the second user device (and/or any other suitable device). More specifically, in some embodiments, the user can manipulate the client device to access a webpage on the Internet and/or to login to an application. After being authenticated (e.g., entering credentials or the like) the user can interact with the webpage and/or application such that a request for access to the contextual image is sent from the client device to the host device. Thus, the host device can retrieve the contextual image from the database and can send a signal to the client device operable in presenting the contextual image on the display (e.g., by graphically rendering the contextual image via the Internet and the webpage) and/or otherwise allow the client device to download the image. Similarly stated, the contextual image can be stored on the "cloud" and accessed via a web browser and/or an application and the Internet.

In other implementations, when a contextual image satisfies the criterion (e.g., when the contextual image matches the facial image data of the user to a predetermined probability, and/or the like), the host device can automatically send the contextual image to the user. For example, in some implementations, the user may also be operating the second user device instantiating an application that is tracking user location data for that user. When an image capture device (e.g., such as an autonomous camera and/or another user device) records image data, the host device can determine that the image data matches the user based on a facial analysis of the image data and facial image data associated with the user. The user's client device can also send location data associated with the user and the client device to the host device. The host device can refine, using both the facial analysis and the location information, the probability that the user appears in the image data. If the probability that the user appears in the image data satisfies a criterion (e.g., exceeds a predetermined threshold, and/or the like), the host device can send the contextual image to the user. Alternatively, the host device can pre-filter the image data based on the location information, such that the probability is calculated when location information of the user is substantially similar to location information of the image data, and does not calculate the probability when the location data of the image data is not substantially similar to the location information of the user.

In other implementations, when image data satisfies the criterion (e.g., when the image data matches the facial image data of the user to a predetermined probability, and/or the like), the host device can store the image data and associate the image data with the user based on the user's interaction with the image data. For example, in some implementations, the user can access an application instantiated on a client device associated with the user, to search for and/or access the image data. The user can, for example, view the image data within the user profile of another user associated with that user, and/or can search for image data to view within an interface of the application. When the user accesses the image data within the application, the application can send a signal to the host device indicating that the user is accessing that image data. The host device can automatically determine whether or not a facial analysis of the image data has been performed based on the facial image data associated with that user, and can automatically perform a facial analysis of the image data, based on that user's facial image data, if the user's facial image data has not been previously compared to the image data. In this manner, the host device can delay processing the image data to identify users within the image data until users attempt to access the image data.

In some instances, a user can search for an event and "check-in" to that event after the event. For example, the user can identify an event (e.g., by viewing a list of events, by viewing location of events on a map, etc.) and can select an event. Based on the user's selection of the event, the host device can perform a facial analysis of the image data associated with that event based on that user's facial image data. If the host device identifies an image including the user (e.g., with a predetermined probability), the host device can provide such image to the user.

While the method 400 is described above as sending and/or receiving image data, contextual data, etc. and presenting and/or sharing user-specific image data with one or more users, it should be understood that a system can be arranged such that video stream data and/or image data can be captured in any suitable manner, analyzed by any suitable device, and sent to and/or shared with any suitable user or user device. By way of example, in some instances, a user can manipulate a user device (e.g., client device such as the client devices 150) to capture a facial image of the user. For example, the user can open a mobile application (e.g., when the user or client device is a smartphone or other mobile or wearable electronic device) and can capture a facial image (e.g., a "selfie") via a camera of the client device. In other words, the user can control the camera of the client device via the application to capture a selfie. Such a selfie can be provided to register a user such that the application can identify facial recognition data (e.g., facial feature characteristics) of the user. This facial recognition data can be used to identify the user in subsequently received videos and/or images.

In some instances, the user can capture content (e.g., image data and/or a video stream) via the application. As described above, the content can be an image and/or a video stream of one or more people in a given context such as, for example, one or more people at a sporting event or the like. In some instances, the user captured (e.g., generated) content can be associated with contextual data such as a time, date, location, venue, event, etc. and/or can otherwise be tagged with data and/or metadata.

In other instances, the user generated content need not be associated with contextual data. The user generated content (e.g., video stream data or the like) can be analyzed via facial recognition and/or other image analysis via the client device or a host device to determine the presence of any registered user (e.g., any user with a user profile stored in the database). If a registered user is identified in the video stream, the user, the client device, and/or the host device can define a user-specific video stream associated with one or more of the identified users. The user, the client device, and/or the host device can then determine whether to share the user-specific video stream with each identified user.

In some instances, the sharing of the user-specific video stream(s) can be automatic based on a user-profile and/or preference and/or based on a setting or the like within the mobile application or account. In other instances, the sharing of the user-specific video stream(s) can be based on a manual or other input from the user (e.g., based on a selection or the like). In still other instances, the sharing of the user-specific video stream(s) can be based on a peer networking session, in which each user (or each client device used in the peer networking session) receives a user-specific video stream. In this manner, the user generated content (e.g., the user captured video stream and/or image data) can be captured, analyzed, and/or shared in a similar manner as those described herein.

The method 400 can further include a registration procedure to register a user in a facial recognition database. The registration procedure can include receiving, at the host device and from a client device (e.g., either first client device or second client device) via the network, a signal indicative of a request to register facial image data associated with a user. For example, in some embodiments, the network can be any suitable network or combination of networks such as, for example, the network 105 described above with reference to FIG. 1. The host device can be substantially similar to or the same as the host device 110 described above with reference to FIGS. 1A, 1B, and 2. Similarly, the client device can be substantially similar to or the same as the client devices 150 described above with reference to FIGS. 1-3. In some instances, the client device can be configured to capture initial facial image data and can send the initial facial image data to the host device. Specifically, in some embodiments, the client device can be configured to capture a user's facial image or images in any suitable manner. Accordingly, the host device can receive facial image data from the client device and can perform any suitable process or the like associated with registering a user and/or the user's facial image data.

The registration procedure also includes registering the facial recognition data associated with the user and storing the facial recognition data in a database in communication with the host device. The database can be any suitable database such as, for example, the database 140 described above with reference to FIG. 1. The registering of the facial recognition data can include any suitable process, method, and/or algorithm associated with facial recognition such as those described above. In some instances, the host device can be configured to define user image data or the like based on the facial recognition and can store at least a portion of the user image data in the database.

In some implementations, the registration procedure can be carried out concurrently with other steps in the method 400. For example, the user of the second user device can include an image of the second user (e.g., a selfie) in the second contextual data. The host device can first register the second user or update the registration of the second user, and then perform the rest of the steps in the method 400, such as comparing the first and second contextual data, facial recognition, and sending the contextual image to the second user if applicable.

In some implementations, the method 400 can be adapted to conduct image analysis without a wireless signal being sent by the first user device and received by the second user device. More specifically, the second user device can generate the second contextual data periodically and/or on a schedule. For example, the second user device can send location information (as part of the second contextual data) of the second user device to the host device, and the first contextual data includes location information of the first user device. The host device can then compare the location information of the first user device with the location information of the second user device. If the two locations are within a predetermined value (e.g., 1 meter, 2 meters, 5 meters, 10 meters, or any other suitable value), the host device can then determine that the user associated with the second user device is potentially present in the image data generated by the first user device. In these implementations, the second user device can send the second location information to the host device periodically, e.g., every 0.1 second, every 0.5 second, every 1 second, every 2 seconds, or any other suitable frequencies.

In some implementations, the first contextual data can also include first timing information associated with the image data (e.g., time at which the image was taken), and the second contextual data can include second timing information representing the time at which the second contextual data was sent to the host device. The host device can further compare this first timing information with the second timing information. If the two times are within a threshold value of each other (e.g., 3 minutes, 2 minutes, 1 minute, 30 seconds, 15 seconds, or less, including any values and sub ranges in between), the host device can then determine that the second user is potentially present in the image data.

Figure 5:
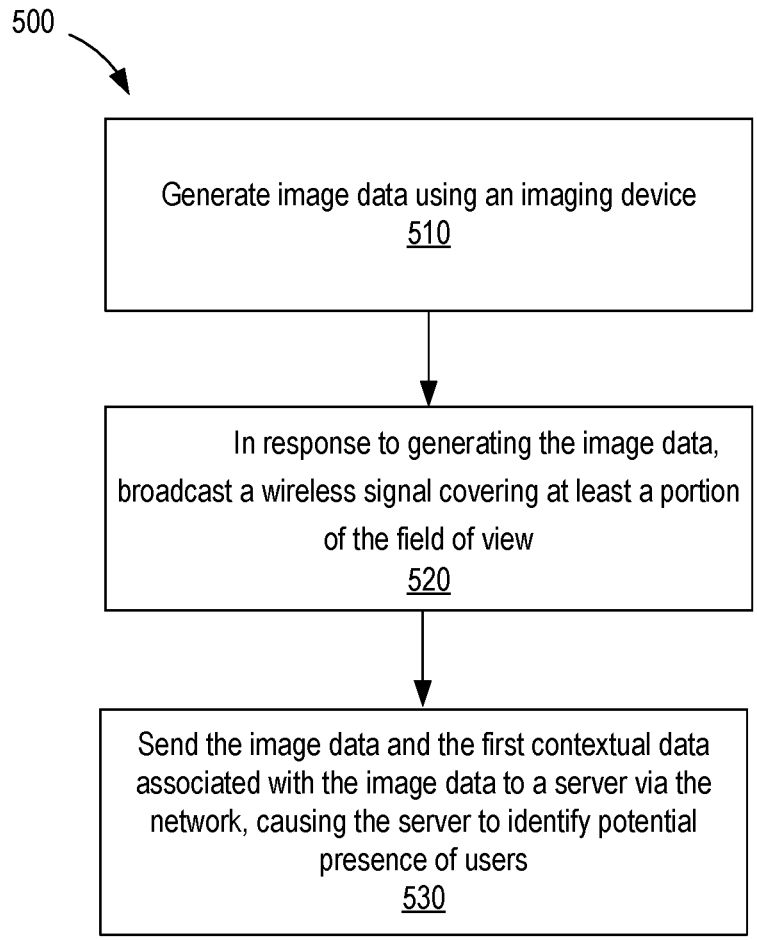
FIG. 5 is a flowchart illustrating a method of using a client device including an imaging device in a video recognition system according to an embodiment.

FIG. 5 is a flowchart illustrating a method 500 of using a client device including an imaging device in a video recognition system, according to an embodiment. The method 500 can be implemented using, for example, the first user device 150a in the system 100 shown in FIGS. 1A and 1B. In this method 500, the first user device 150a generates image data using an imaging device (e.g., representative of a field of view), at 510. In some instances, the image data can be generated using the imaging device included in the first user device. In other instances, the image data can be generated using an imaging device operably coupled to the first user device. For example, the imaging device can include a camera at a stadium. The camera can communicate with a computing device (e.g., computer or phone) and transmit the acquired image data (including video) to the computing device, which in turn sends the image data to the host device.

At 520, in response to the imaging device generating the image data, the first user device can control the communication interface to broadcast a wireless signal covering at least a portion of the field of view of the image data. The wireless signal includes at least a portion of first contextual data associated with the image data. As described above, the first contextual data can include information representing the location of the first user device, the time of acquiring the image data, ID information (e.g., serial number) assigned to the image data, ID information associated with the first user device, and/or ID information associated with an operator of the first user device, among others.

In some implementations, the wireless signal is automatically sent when the image data is captured. In other implementations, the operator of the first user device can control the first user device to withhold the wireless signal. For example, the operator can take an image of a scene without any person in the image, in which case the operator of the first user device can prevent and/or restrict the first user device from broadcasting a wireless signal so as to reduce the computing load of the first compute device and/or the server.

At 530, the first user device sends the image data and the first contextual data associated with the image data to a server (e.g., host device 100 in the system 100) via the network such that the server performs image analysis. The image analysis includes determining a potential presence of a user in the image data based on comparing the first contextual data with second contextual data. The second contextual data is associated with the user of a second user device and generated in response to the second user device receiving the wireless signal. The image analysis also includes analyzing the image data based on at least one of two-dimensional facial recognition analytics, three-dimensional facial recognition analytics, or a convolutional neural network (CNN) to identify the user in the image data.

As described above, the second contextual data can include, for example, location information of the second user device, time of receiving the wireless signal from the first user device, time of sending the second contextual data, and ID information associated with the second user device and/or the second user, among others. The second contextual data can also include at least a portion of information contained in the wireless signal, such as the ID information of the image data.

Figure 6:
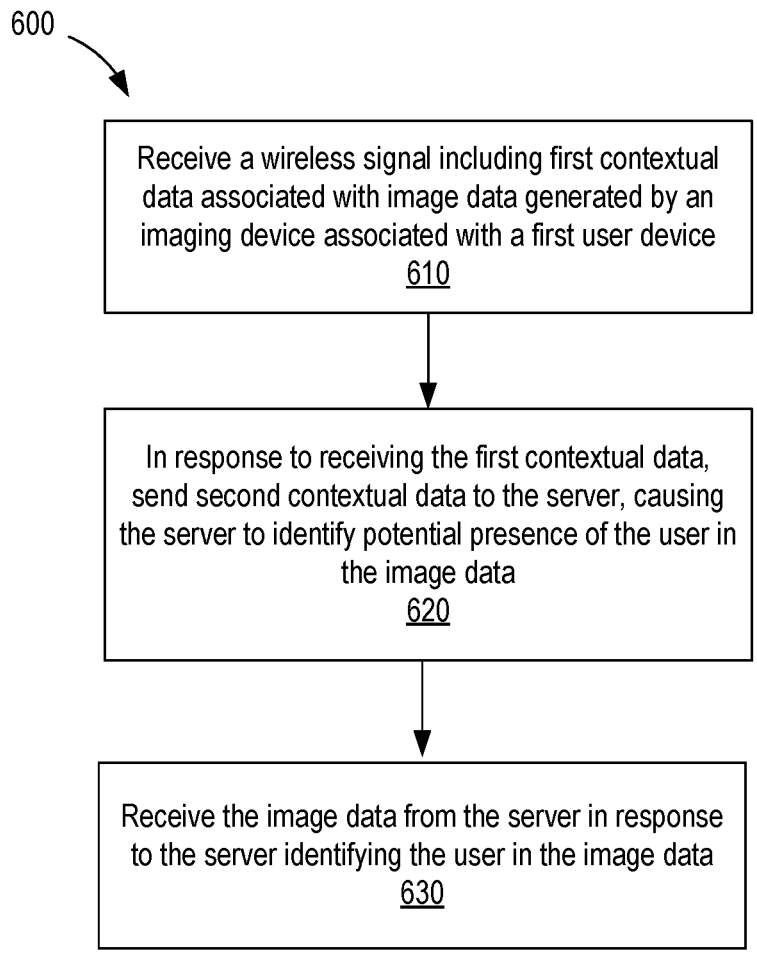
FIG. 6 is a flowchart illustrating a method of using a client device in a video recognition system according to an embodiment.

FIG. 6 is a flowchart illustrating a method 600 of using a client device in a video recognition system according to an embodiment. The method 600 can be implemented using, for example, the second user device 150b in the system 100 shown in FIGS. 1A-1B. In this method 600, the second user device receives, from a first user device, a wireless signal including first contextual data associated with image data generated by an imaging device associated with the first device, at 610. The first device is further configured to send the image data and the first contextual data to a server.

At 620, in response to receiving the first contextual data, the second user device sends second contextual data to the server such that in response to receiving the second contextual data, the server performs image analysis. The image analysis includes determining a potential presence of a user in the image data based on comparing the first contextual data with the second contextual data. The image analysis also includes analyzing the image data based on at least one of two-dimensional facial recognition analytics, three-dimensional facial recognition analytics, or a convolutional neural network (CNN) to identify the user in the image data.

In some implementations, the second contextual data is sent automatically in response to receiving the wireless signal from the first user device. In other implementations, the second user can have the option to turn off the transmission of the second contextual data (e.g., to protect privacy) and/or the user provides approval prior to sending the second contextual data.

At 630, the second user device receives the image data from the server in response to the server identifying the user in the image data. Alternatively, the second user device receives an indication that the second user is identified in one or more images (or video streams), thereby prompting the second user to review the images stored on the host device (or a database associated with the host device).

In some implementations, the second user device receives a request to confirm the recognition performed by the host device. The second user can have the option to "de-tag" the recognition (e.g., to protect privacy). In some implementations, the second user can have the option to suggest a new recognition. For example, the second user can provide identity information of persons in the image data, and the host device can conduct the facial recognition again based on this identity information.

While various embodiments have been described above, it should be understood that they have been presented by way of example only, and not limitation. For example, while the embodiments and methods have been described herein as defining a contextual image and/or video stream of a user at an event or the like and sending the contextual image and/or video stream to a client device and/or otherwise allowing access to the contextual image and/or video stream via, for example, a web browser and the Internet, in other embodiments, a host device can store, in a database, any number of contextual images and/or video streams associated with a user. In some instances, the host device can be configured to define a user profile or the like that can include any number of contextual images and/or video streams of the user. In some instances, the user can access his or her user profile via a mobile application, a computer application, a web browser and the Internet, and/or the like. Moreover, in some instances, the user can share or otherwise request the host device to share any number of contextual images and/or video streams of the user with a different user and/or via a social media site. In some instances, a user can allow access to a portion of his or her user profile such that other users can view the contextual images and/or video streams included therein.

While specific examples have been particularly described above, the embodiments and methods described herein can be used in any suitable manner. For example, while the system 100 is described above as defining a contextual image and/or video stream of a user at a sporting event, in other embodiments, the methods described herein can be used to identify an individual using, for example, facial recognition and video analytics in any suitable setting, venue, arena, event, etc. For example, in some implementations, the methods described above can be used to capture a contextual image and/or video stream at a concert, a rally, a graduation, a party, a shopping mall, a place of business, etc. In one example, a host device can receive a contextual video stream from, for example, a graduation. In some instances, as described above, the host device can perform any suitable facial recognition and/or video analytics to identify the graduate (and/or any individual and/or user). Moreover, the host device can be configured to analyze contextual information such as, a user profile associated with the graduate, an order of students walking across the stage, location data associated with the graduate's client device, and/or any other suitable data. As such, the host device can analyze the data to verify the identity graduate (e.g., when the data satisfies a criteria(ion)) and can define a contextual video stream of the graduate, for example, as he or she walks across the stage to receive a diploma or the like. In other instances, the host device can identify a family member or friend of the graduate and can define a contextual video stream of him or her in a similar manner.

While the embodiments have been described above as being performed on specific devices and/or in specific portions of a device, in other embodiments, any of the embodiments and/or methods described herein can be performed on any suitable device. For example, while the contextual images and/or video streams have been described above as being sent to a host device (e.g., the host device 110) for facial recognition and/or image analysis, in other embodiments, any suitable analysis can be performed on or at a client device. For example, in some instances, a user can capture a video stream (e.g., a contextual video stream) via a camera of the client device and in response, the client device can analyze the video to identify any number of registered users or the like in the video stream. In some instances, the analysis can be via a convolutional neural network sent to and/or stored on the client device (e.g., stored in memory and associated with the system application). In some instances, the analysis can be pre-processed and/or pre-sorted based on, for example, the user's contact list, friends list, established connections, contextual data, etc., as described above. In some instances, the client device can send a user-specific video stream to any identified user, as described above. In other embodiments, the client device can upload and/or send the analyzed video stream and/or the user-specific video stream(s) to the host device 110 and/or the database 140.

While video streams and/or image data is described above as being "contextual," it should be understood that the video stream data and/or image data can be independent of and/or unassociated with "contextual data." For example, in some instances, a user can capture a video stream and/or image and can upload the video stream and/or image for processing without defining and/or sending contextual data associated with the video stream and/or image data. In some instances, a host device or the like (e.g., the host device 110) can receive the user-generated video stream and/or image data and in response, can perform one or more facial recognition processes and/or any other suitable analytics on the data to define, for example, a user-specific video stream or user-specific image that is independent of contextual data. As used herein, a user-specific video stream or user-specific image can be defined with or without using contextual data. For example, the host device can be configured to identify a user in an image by analyzing the image against facial recognition data of the user stored in the database without using contextual data.

While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above. While specific methods of facial recognition have been described above according to specific embodiments, in some instances, any of the methods of facial recognition can be combined, augmented, enhanced, and/or otherwise collectively performed on a set of facial recognition data. For example, in some instances, a method of facial recognition can include analyzing facial recognition data using Eigenvectors, Eigenfaces, and/or other 2-D analysis, as well as any suitable 3-D analysis such as, for example, 3-D reconstruction of multiple 2-D images. In some instances, the use of a 2-D analysis method and a 3-D analysis method can, for example, yield more accurate results with less load on resources (e.g., processing devices) than would otherwise result from only a 3-D analysis or only a 2-D analysis. In some instances, facial recognition can be performed via convolutional neural networks (CNN) and/or via CNN in combination with any suitable two-dimensional (2-D) and/or three-dimensional (3-D) facial recognition analysis methods. Moreover, the use of multiple analysis methods can be used, for example, for redundancy, error checking, load balancing, and/or the like. In some instances, the use of multiple analysis methods can allow a system to selectively analyze a facial recognition data set based at least in part on specific data included therein.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware sections may include, for example, a general-purpose processor, a field programmable gate array (FPGA), and/or an application specific integrated circuit (ASIC). Software sections (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The invention claimed is:

1. An apparatus, comprising:
a memory;
a communication interface in communication with the memory and configured to communicate via a network; and
a processor in communication with the memory and the communication interface, the processor configured to receive, via the network and the communication interface and from an imaging device, image data and first contextual data associated with the image data, the image data including at least one image of a field of view of the imaging device,
the processor configured to receive, via the network and the communication interface and from a user device different from the imaging device, second contextual data automatically generated in response to the user device receiving a wireless signal within the field of view and that is automatically sent from the imaging device in response to the imaging device generating the image data,
the processor configured to:
determine a potential presence of a user associated with the user device in the image data based on comparing the first contextual data with the second contextual data,
analyze the image data based on at least one of two-dimensional facial recognition analytics, three-dimensional facial recognition analytics, or a convolutional neural network (CNN) to identify the user in the image data, and
send the image data depicting the user to the user device.

2. The apparatus of claim 1, wherein the wireless signal includes a Bluetooth signal.

3. The apparatus of claim 1, wherein the wireless signal includes a directed wireless signal toward the field of view.

4. The apparatus of claim 1, wherein the image data includes video stream data.

5. The apparatus of claim 1, wherein the processor is configured to:
analyze the image data in response to receiving the second contextual data to search for the user in the image data, and
confirm the presence of the user in the image data based on comparing the first contextual data with the second contextual data.

6. The apparatus of claim 1, wherein:
the first contextual data includes a first timestamp associated with the image data,
the second contextual data includes a second timestamp associated with receipt of the wireless signal by the user device, and
the processor is configured to determine the potential presence of the user when a difference between the first timestamp and the second timestamp is within a threshold value.

7. The apparatus of claim 1, wherein:
the first contextual data includes a first geolocation associated with the image data,
the second contextual data includes a second geolocation associated with the user device, and
the processor is configured to determine the potential presence of the user if a difference between the first geolocation and the second geolocation is within a threshold value.

8. The apparatus of claim 1, wherein:
the first contextual data includes first identification information associated with the imaging device,
the second contextual data includes second identification information associated with the user device, and
the processor is configured to determine the potential presence of the user by comparing the first identification information with the second identification information.

9. The apparatus of claim 1, wherein:
the memory is configured to store a plurality of user profile data structures, each user profile data structure from the plurality of user profile data structures including facial recognition data of an associated user,
the second contextual data includes identification information associated with the user device, and
the processor is configured to: (i) retrieve a user profile data structure from the plurality of user profile data structures and associated with the user, based on the identification information associated with the user device; and (ii) identify the user in the image data based on comparing the facial recognition data in the user profile data structure and the image data.

10. The apparatus of claim 1, wherein the processor is further configured to:
receive a facial image from the user,
generate facial recognition data, using the facial image, based on at least one of the two-dimensional facial recognition analytics, the three-dimensional facial recognition analytics, or the CNN,
identify the user in the image data based on comparing the facial recognition data and the image data.

11. An apparatus, comprising:
an imaging device configured to generate image data representative of a field of view of the imaging device;
a communication interface in communication with the imaging device and configured to communicate via a network; and
a processor in communication with the imaging device and the communication interface,
in response to the imaging device generating the image data, the processor configured to:
control the communication interface to automatically broadcast a wireless signal covering an area within at least a portion of the field of view, the wireless signal including at least a portion of first contextual data associated with the image data, and
control the communication interface to send the image data and the first contextual data associated with the image data to a server via the network such that, in response to receiving the image data, the server:
determines a potential presence of a user associated with a user device different from the imaging device in the image data based on comparing the first contextual data with second contextual data received from the user device and that is automatically generated in response to the user device receiving the wireless signal within the field of view, the second contextual data including at least the portion of the first contextual data, and
analyzes the image data based on at least one of two-dimensional facial recognition analytics, three-dimensional facial recognition analytics, or a convolutional neural network (CNN) to identify the user in the image data.

12. The apparatus of claim 11, wherein the image data includes video stream data.

13. The apparatus of claim 11, wherein the wireless signal includes a Bluetooth signal.

14. The apparatus of claim 11, wherein the wireless signal is a directed wireless signal toward the field of view.

15. The apparatus of claim 11, wherein:
the first contextual data includes a first timestamp associated with the image data,
the second contextual data includes a second timestamp associated with receipt of the wireless signal by the user device, and
the processor is configured to control the communication interface to send the image data and the first contextual data associated with the image data to the server such that the server determines the potential presence of the user when a difference between the first timestamp and the second timestamp is within a threshold value.

16. The apparatus of claim 11, wherein:
the first contextual data includes a first geolocation associated with the image data,
the second contextual data includes a second geolocation associated with the user device, and
the processor is configured to control the communication interface to send the image data and the first contextual data associated with the image data to the server such that the server determines the potential presence of the user if a difference between the first geolocation and the second geolocation is within a threshold value.

17. The apparatus of claim 11, wherein:
the first contextual data includes first identification information associated with the imaging device,
the second contextual data includes second identification information associated with the user device, and
the processor is configured to control the communication interface to send the image data and the first contextual data associated with the image data to the server such that the server determines the potential presence of the user when the second contextual data includes at least a portion of the first identification information.

18. The apparatus of claim 11, wherein:
the second contextual data includes identification information associated with the user device, and
the processor is configured to control the communication interface to send the image data and the first contextual data associated with the image data to the server such that the server: (i) retrieves a user profile data structure from a plurality of user profile data structures and including facial recognition data associated with the user, based on the identification information; and (ii) identifies the user in the image data based on comparing the facial recognition data in the user profile data structure with the image data.

19. An apparatus, comprising:
a communication interface; and
a processor in communication with the communication interface, the processor configured to:
control the communication interface to receive, from a user device, a wireless signal including first contextual data associated with image data automatically generated by an imaging device associated with the user device, the user device further configured to send the image data and the first contextual data to a server, the user device broadcasting the wireless signal within a field of view of the imaging device, and
in response to receiving the wireless signal, automatically generate second contextual data and control the communication interface to send the second contextual data to the server such that in response to receiving the second contextual data, the server:
determines a potential presence of a user associated with the apparatus in the image data based on comparing the first contextual data with the second contextual data,
analyzes the image data based on at least one of two-dimensional facial recognition analytics, three-dimensional facial recognition analytics, or a convolutional neural network (CNN) to identify the user in the image data, and
the processor configured to receive the image data from the server and via the communication interface in response to the server identifying the user in the image data.

20. The apparatus of claim 19, wherein the wireless signal includes a Bluetooth signal.

21. The apparatus of claim 19, wherein:

the first contextual data includes a first timestamp associated with the image data, the second contextual data includes a second timestamp associated with receipt of the wireless signal from the user device, and the processor is configured to control the communication interface to send the second contextual data to the server such that in response to receiving the second contextual data, the server determines the potential presence of the user when a difference between the first timestamp and the second timestamp is within a threshold value.

22. The apparatus of claim 19, wherein:

the first contextual data includes a first geolocation associated with the image data, the second contextual data includes a second geolocation associated with the apparatus, and the processor is configured to control the communication interface to send the second contextual data to the server such that in response to receiving the second contextual data, the server determines the potential presence of the user if a difference between the first geolocation and the second geolocation is within a threshold value.

23. The apparatus of claim 19, wherein:

the first contextual data includes first identification information associated with the user device, the second contextual data includes second identification information associated with the apparatus, and the processor is configured to control the communication interface to send the second contextual data to the server such that in response to receiving the second contextual data, the server determines the potential presence of the user when the second contextual data includes at least a portion of the first identification information.

24. The apparatus of claim 19, wherein:

the second contextual data includes identification information associated with the user, the processor is configured to control the communication interface to send the second contextual data to the server such that in response to receiving the second contextual data, the server (i) retrieves, based on the identification information, a user profile data structure associated with the user from a memory storing a plurality of user profile data structures, each user profile data structure including facial recognition data of an associated user, and (ii) identifies the user in the image data based on comparing the facial recognition data in the user profile data structure and the image data.

25. The apparatus of claim 19, wherein the processor is configured to send a facial image of the user to the server such that the server (i) generates facial recognition data based on at least one of the two-dimensional facial recognition analytics, the three-dimensional facial recognition analytics, or the CNN, and (ii) identifies the user in the image data based on comparing the facial recognition data and the image data.

* * * * *